(12) United States Patent
Topmiller et al.

(10) Patent No.: US 6,827,202 B2
(45) Date of Patent: Dec. 7, 2004

(54) METHODS AND APPARATUS FOR CONTROLLING CONVEYOR ZONES

(75) Inventors: David Allen Topmiller, Fort Wright, KY (US); James W. Braun, Cincinnati, OH (US); James Clinton Ramler, Burlington, KY (US)

(73) Assignee: Balluff, Inc., Florence, KY (US)

( * ) Notice: Subject to any disclaimer, the term of this patent is extended or adjusted under 35 U.S.C. 154(b) by 0 days.

(21) Appl. No.: 10/172,885

(22) Filed: Jun. 17, 2002

(65) Prior Publication Data

US 2003/0116408 A1 Jun. 26, 2003

Related U.S. Application Data

(60) Provisional application No. 60/344,881, filed on Dec. 21, 2001.

(51) Int. Cl.$^7$ .............................................. B65G 13/06
(52) U.S. Cl. ......................... 198/781.05; 198/781.06; 198/783
(58) Field of Search ..................... 198/781.01, 781.05, 198/781.06, 783

(56) References Cited

U.S. PATENT DOCUMENTS

| | | | |
|---|---|---|---|
| 4,383,605 A | | 5/1983 | Harwick |
| 4,453,627 A | | 6/1984 | Wilkins |
| 4,925,005 A | | 5/1990 | Keller |
| 5,060,785 A | | 10/1991 | Garrity |
| 5,086,910 A | | 2/1992 | Terpstra |
| 5,186,308 A | | 2/1993 | Munro |
| 5,191,967 A | * | 3/1993 | Woltjer et al. ......... 198/781.06 |
| 5,285,887 A | | 2/1994 | Hall |
| 5,316,130 A | | 5/1994 | Heit et al. |
| 5,318,167 A | | 6/1994 | Bronson et al. |
| 5,348,139 A | | 9/1994 | Szarkowski et al. |
| 5,358,097 A | | 10/1994 | Bakkila et al. |
| 5,429,225 A | | 7/1995 | Schiesser et al. |
| 5,456,347 A | | 10/1995 | Best et al. |
| 5,540,323 A | | 7/1996 | Schiesser et al. |
| 5,582,286 A | | 12/1996 | Kalm et al. |
| 5,730,274 A | | 3/1998 | Loomer |
| 5,862,907 A | | 1/1999 | Taylor |
| 5,906,267 A | | 5/1999 | Heit et al. |
| 6,021,888 A | | 2/2000 | Itoh et al. |
| 6,035,998 A | | 3/2000 | Garzelloni |
| 6,035,999 A | * | 3/2000 | Hall ....................... 198/781.06 |
| 6,047,812 A | | 4/2000 | Horn et al. |
| 6,098,789 A | | 8/2000 | Ernst |
| 6,193,054 B1 | * | 2/2001 | Henson et al. .............. 198/783 |
| 6,315,104 B1 | * | 11/2001 | Ebert .................... 198/781.06 |
| 6,460,683 B1 | * | 10/2002 | Pfeiffer .................. 198/781.05 |

OTHER PUBLICATIONS

Hytrol Conveyor Company, Inc., *The Ezlogic™ Accumulation System*, http://www.hytrol.com/ezlogic/ezlogic.html, 1999–2000, pp. 1–2.
Hytrol Conveyor Company, Inc., *Hytrol Ezlogic™ Accumulation System Component Manual*, Apr. 1998, pp. 1–31.
Sick Optic–Electronic Photoelectric Sensors, *WTRI, Roller Conveyor Sensor*, pp. 274–277.
Hytrol Conveyor Company, Inc., *What's New with Generation II*, http://www.hytrol.com/ezlogic/index.html, 1999–2000, p. 1.
Efector, Inc., *A Simple and Complete Wiring System.*
Cutler–Hammer, *Conveyor Sensor Systems 200 Series Zero Pressure Accumulation*, Jun. 2000, pp. 1–3.
Humphrey Products Company, Catalog 555, *Series 555/565/575 Material Handling Elastro–Pneumatic Valve/Sensor System*, Apr. 2000, pp. 1–7.

* cited by examiner

*Primary Examiner*—James R. Bidwell
(74) *Attorney, Agent, or Firm*—Dinsmore & Shohl LLP

(57) ABSTRACT

One aspect of the present invention relates to a module for controlling two or more zones of an accumulating conveyor system. In one embodiment, the single module includes outputs to provide independent actuation signals to cause movement of two zones of the conveyor. The module includes two sensor inputs to receive article detection signals from two zones. Circuitry controls the actuation signals based upon the detection signals received. According to another aspect, a control module is provided with an input for indicating the speed of the conveyor to be used, such that programmed features of the module can be adjusted according to the speed selected. According to another aspect, a sleep mode of operation is provided wherein multiple downstream zones are awakened upon the detection of an article in an upstream zone.

19 Claims, 17 Drawing Sheets

METHODS AND APPARATUS FOR CONTROLLING CONVEYOR ZONES

CROSS-REFERENCE TO RELATED APPLICATION

This application claims the benefit of U.S. Provisional Application No. 60/344,881 filed Dec. 21, 2001, the entire disclosure of which is hereby incorporated herein by reference.

TECHNICAL FIELD

The present invention relates generally to the control of zones or sections of conveyor systems, and, more specifically, in one embodiment, to a method and apparatus for controlling multiple zones of an accumulating conveyor.

BACKGROUND OF THE INVENTION

Conveyors can be utilized to transport products, parts, cartons, packages, material, or other such items from one location to another. The items can be placed upon conveying elements such as movable rollers or belts which carry the items to their destination.

Accumulating conveyors are conveyors which are divided into a plurality of zones that extend from the inlet end to the exit end. These zones are sections of the conveyor where driving force to move the conveying elements for the zone may be either applied or removed independently of the other zones in the system. Such conveyors are useful in that certain portions of the conveyor can be stopped and started as needed, independent from similar control of other portions. For example, if it is determined that items downstream cannot be removed from the last zone of the conveyor quickly enough, or that certain items are otherwise stopped or jammed in position, the upstream zones can be sequentially stopped to allow items to line up across the conveyor during the delay. Thus, in the case of the failure to timely remove items from the end of the conveyor, a signal can be provided such that the items will not continue moving and thus will not fall off the conveyor and possibly become damaged. Likewise, in the case of a stoppage or jam, a signal can be provided to stop upstream items such that they will not collide with one another and possibly become damaged.

In accumulating conveyors, each zone can be driven by a one or more drive mechanisms, such as motors or the like, to deliver the driving force. In particular, in some accumulating conveyors, a chain is driven by a motor and the driven chain is selectively engageable with the rollers of a given zone. The items to be moved rest upon these rollers.

To move the chain into engagement with the rollers, an actuator or clutch can be selectively moved, such as under the power of a pneumatic valve. For example, a valve can be moved to an open position providing pneumatic pressure to the actuator and causing movement of the actuator and chain toward the rollers and subsequent engagement of the chain and rollers. To disengage the chain and the rollers and to subsequently stop the rollers from moving, such as in the event of a downstream jam or delay, the force can be removed by returning the valve to a closed position, thereby moving the actuator and chain away from-the rollers and thereby disengaging the chain and rollers. Sensors can be utilized to determine whether a stoppage or delay has occurred, and the valves can then be appropriately controlled to stop or drive appropriate zones across the conveyor.

A control module having valves and electronic control circuitry can be utilized for controlling an individual zone of such a conveyor. Each such module can communicate with one or more other modules to determine whether to drive or stop its respective zone. While such modules having electronics and valves can be provided for each zone in the conveyor, the cost of such a system can be high, and the time and complexity in connecting the various modules can be excessive. Accordingly, it is desirable to decrease the cost, components, and/or complexity of controlling accumulating conveyors.

Furthermore, control modules for accumulating conveyors can be provided with programmable features, such as sleep, timer delay, and jam modes for instance. For example, a sleep mode (also referred to as a snooze mode) can be initiated to stop the movement of a zone, if an item has not been present in the zone for a predetermined amount of time. Such a feature can reduce energy usage, minimize wear of moving parts, and/or reduce audible noise. A timer delay can be utilized to delay the deactivation or activation of a zone until a timer has expired, such that throughput can be increased in the event that the condition is quickly removed which would otherwise have caused the deactivation or activation (e.g., by delaying the passing or utilization of a signal from a sensor or from another module). As another example, a jam mode can be initiated to stop upstream zones, if an item is continually sensed in a downstream zone for a predetermined amount of time. Such a feature can prevent collision of items and then resume movement of items once the jam is cleared. However, the accuracy and effectiveness of such features can often depend upon the speed of the conveyor. Accordingly, it is desirable to provide more accurate and effective programmed control of the zones of accumulating conveyors.

SUMMARY OF THE INVENTION

It is an advantage of one or more illustrative embodiments of the invention to decrease the cost, components, and/or complexity of controlling accumulating conveyors.

An advantage of one or more illustrative embodiments of the invention is to provide more accurate and effective control of the zones of accumulating conveyors.

In accordance with at least one embodiment of the present invention, a control module is provided for controlling at least two conveyor zones in an accumulating conveyor. The module of this embodiment comprises an input configured to receive a first article detection signal from a first article detection sensor for a first zone in an accumulating conveyor, an input configured to receive a second article detection signal from a second article detection sensor in a second zone of the accumulating conveyor, and an input configured to receive a command signal from another control module. The first zone comprises a plurality of rollers selectively rotatable in unison by a drive mechanism, and the second zone comprises a plurality of rollers selectively rotatable in unison by a drive mechanism. The control module further comprises an output configured to provide a first actuation signal to cause selective rotation of the rollers of the first zone of the conveyor, and an output configured provide a second actuation signal to cause selective rotation of the rollers of the second zone of the conveyor. Moreover, the control module comprises a control circuit receiving the first and second article detection signals and the command signal and configured to independently control the first and second actuation signals based upon the status of the first and second article detection signals and the command signal. In some embodiments, the control module may include a pair of pneumatic valves configured to provide the actuation signals under control of the control circuit, the actuation signals comprising pneumatic signals. Switches can also be included and configured to provide input signals to the control circuit for selecting the mode of operation of the control circuit. Additional similar article detection inputs and actuation outputs can be provided if it is desired to control additional zones with this single control module. For example, the module can be provided with an article detection input and actuation output for three or more zones.

Furthermore, according to at least one embodiment, a control system is provided for an accumulating conveyor having a plurality of independently driven zones. The system comprises an input/output module including an input configured to receive a first article detection signal from a first article detection sensor for a first zone in an accumulating conveyor, and an input configured to receive a second article detection signal from a second article detection sensor in a second zone of the accumulating conveyor. The first zone comprises a plurality of rollers selectively rotatable in unison by a drive mechanism, and the second zone comprises a plurality of rollers rotatable in unison by a single drive mechanism. The input/output module further comprises an output configured to provide a first actuation signal to cause selective rotation of the rollers of the first zone of the conveyor, and an output configured provide a second actuation signal to cause selective rotation of the rollers of the second zone of the conveyor. The system further includes a control module in communication with the input/output module to receive the first and second article detection signals, wherein the control module is configured to control the first and second actuation signals using the status of the first and second article detection signals. In some embodiments, the input/output module can comprise a pair of pneumatic valves configured to provide the actuation signals under control of the control module. Additional similar article detection inputs and actuation outputs can be provided if it is desired to control additional zones with this single control module.

Moreover, in accordance with at least one embodiment, a method is provided for controlling two or more conveyor zones using a single control module. The method comprises receiving in a control module at least one command signal from another control module for controlling the mode of operation of the control module. The method further comprises using a control circuit in the control module to control a first actuation signal for control of a first conveyor zone in response to the command signal. In addition, the method comprises using the control circuit in the control module to control a second actuation signal for control of a second conveyor zone in response to the command signal. In some embodiments, the command signal can comprise at least one of an accumulation and release signal, and the control circuit can receive article detection signals from sensors indicating whether articles are present in two zones of the conveyor In addition, according to at least one embodiment of the invention, a method is provided for controlling at least one conveyor zone. The method comprises receiving an article detection signal from a zone of a conveyor, and receiving an input signal from a user representing the speed at which the conveyor will run. Moreover, the method comprises using the input signal and the article detection signal to provide an actuation signal for control of a zone of the conveyor.

Moreover, in accordance with at least one embodiment of the invention, a control module is provided for controlling at least one zone of a conveyor. The control module includes an input configured to receive an article detection signal from a zone of a conveyor, and an output configured to provide an actuation signal for control of a zone of the conveyor. The module further comprises a user interface configured to receive an input from a user representing the speed at which the conveyor will run, and a control circuit configured to use the input signal and the article detection signal to set the actuation signal.

In addition, according to at least one embodiment of the invention, a method for controlling a zone of a conveyor using a sleep mode of operation is provided. The method comprises deactivating the present zone of a conveyor based upon the absence of one or more articles in one or more zones of the conveyor. The method further comprises reactivating the present zone of the conveyor as well as at least one downstream zone, based upon the presence of one or more articles in one or more zones of the conveyor.

Still other advantages, aspects, and embodiments of the present invention will become apparent to those skilled in this art from the following description wherein there is shown and described details of illustrative embodiments of this invention, simply for the purposes of illustration and describing currently contemplated best modes. As will be realized, other different aspects and embodiments can be provided without departing from the scope of a given claim, and particular aspects, details, embodiments, principles, and advantages mentioned should not be viewed as restricting a given claim. Accordingly, the drawings and descriptions are to be regarded as illustrative in nature and not restrictive in nature.

BRIEF DESCRIPTION OF THE DRAWINGS

The illustrative embodiments will be understood from the following description taken in conjunction with the accompanying drawings in which:

FIG. 6 is a flow diagram showing an illustrative method to be utilized by a control module for controlling multiple zones during a singulation mode, according to particular principles of the present invention

DETAILED DESCRIPTION OF ILLUSTRATIVE EMBODIMENTS

In general, one aspect of the present invention relates to a controller module for controlling two or more zones of an accumulating conveyor system. In one illustrative embodiment, the single module includes two valve outputs to selectively provide actuation signals to cause movement of two zones of the conveyor. In addition, the module includes two sensor inputs to receive article detection signals from two zones. Programmed electronics in the module control the opening and closing of the valves based upon the detection signals received at the inputs. The electronics can operate in singulation and/or multi-slug modes, such as via selectable switches, and can also operate with jam detect, sleep, and/or delay features according to these or other switches. In accordance with another aspect of the invention, a control module for one or more conveyor zones is provided with an input for indicating the speed of the conveyor with which the module will be used, such that programmed features of the module can be adjusted according to the speed selected. According to another aspect of the invention, a sleep mode of operation is provided for modules which control one or more conveyor zones, wherein multiple downstream zones or modules are awakened upon the detection of an article in an upstream zone.

Figure 1:
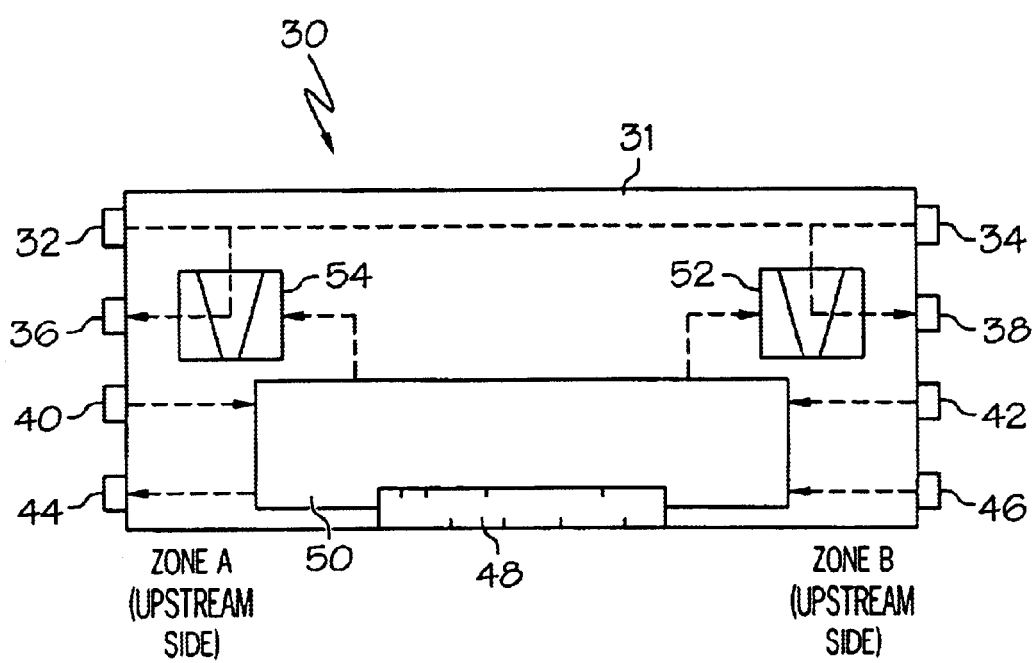
FIG. 1 is a schematic diagram showing an illustrative embodiment of a multiple zone controller module, made in accordance with particular principles of the present invention.

FIG. 1 is a schematic diagram showing an illustrative embodiment of a multiple zone controller module 30, made in accordance with principles of the present invention. In this embodiment, the module 30 includes a pneumatic supply input connector 32 for receiving a supply of air from a source (not shown). The supply of air is fed through the module and provided at a pneumatic supply output connector 34, so as to pass the supply of air to another module, such as an identical control module 30, for use in a system where multiple modules are used to control a number of zones in a conveyor. However, instead of this serial passing of the air supply between modules 30, each module to be used with a given conveyor can be connected to the source in other manners, such as direct connections for each via piping along the conveyor. The inputs and outputs 32 and 34 can comprise hose fittings or barbs or other suitable connectors, and the supply of air can be provided to and from the module 30 by hoses, piping, or other suitable conduit. In addition, the flow can be reversed such that connection 34 serves as an input while connection 32 serves as an output. Accordingly, these connections can serve as input/output connections.

The illustrative module 30 further includes two outputs 36 and 38 which are independently operated by a control circuit in the module. Each output 36, 38 independently provides a pneumatic actuation signal to a zone of the conveyor. Each actuation signal can then move an actuator, such as a "puck" or clutch for example, which is associated with the zone. According to the state of the signal, the actuator then selectively engages the drive mechanism with the conveying element(s) via a suitable transmission mechanism. For example, the signal can move a clutch or puck which forces a chain driven by a motor into engagement with conveyor rollers. The outputs 36 and 38 can comprise suitable fittings or connectors, such as hose barbs, for supplying the pneumatic signals to the actuators of the two zones to be controlled. A hose, pipe, or other suitable conduit can then supply the pneumatic actuation signal from the output 36 or 38 to the respective actuator. Because two outputs 36 and 38 are provided in a single controller module 30 and are independently controlled by control circuitry in the module, this single module 30 controls multiple zones of the conveyor.

Continuing with the description of this example, the module 30 further includes a pair of inputs (e.g., pins, wires, channels, cables, a multi-signal communication line, or connections, etc.) 40, 42 for receiving signals from sensors which detect the presence and absence of articles (i.e., items) in two zones of the conveyor. Exemplary sensors for connection to the inputs 40, 42 include proximity detectors, photo-electric sensors or "photo-eyes", although other types of sensors could be utilized, such as mechanical pressure sensors, contact sensors, and other appropriate sensors which provide a signal indicating the presence or absence of an article. Exemplary photo-electric sensors which could be utilized include those of the retro-reflective or diffuse type, those of the light-on or the light-off type, and those of the PNP or NPN type. These sensors can connect in any of a variety of manners, such as through the use of three pin connectors for example. In the event that photo-electric sensors are utilized, the inputs 40, 42 can be suitable connectors for interfacing with such sensors, such as 3-pin connectors for example. While the sensors are not provided with the module 30 in this example, it is contemplated that sensors could be integrated with the module if desired. Two sensor inputs 40, 42 are provided in this example because the module 30 controls two zones of a conveyor. If more zones were to be controlled by the module 30, such as three or four for example, then additional inputs could be provided. Alternatively, the various input signals from the sensors for the various zones could be transmitted via a single channel.

The module 30 further includes a pair of communication interfaces 44, 46 for communicating with adjacent multiple zone controllers. In this example, the communication interface 44 comprises a communication port and the communication interface 46 comprises a communication port. One of these interfaces 44, 46 allow the module 30 to communicate with (i.e., receive signals from and/or send signals to) an upstream module which controls two zones upstream from the two zones controlled by the module 30, and the other of these interfaces 44, 46 allow the module 30 to communicate with a downstream module which controls two zones downstream from the two zones controlled by the module 30. Each interface 44, 46 can include one or more inputs and/or outputs (e.g., pins, wires, channels, communication lines, cables, connections, etc.) for providing these communication signals amongst the modules. Moreover, if desired, the interfaces 44, 46 can also be used for passing a power signal from module to module, such that the modules can simultaneously receive power from a power source. In sum, the interfaces 44, 46 allow the module 30 to be connected to other modules for providing communication signals and/or power signals to the other modules. Other communication interfaces could be utilized as alternatives to those shown, such as wireless devices for example. As will be explained in further detail below, one of the interfaces 44, 46 can be utilized to receive a command signal which indicates whether the control circuit in the module 30 should operate in an accumulation or a release mode of operation (depending on whether an accumulation signal has been provided downstream). Likewise, the other of the interfaces 44, 46 can be utilized to transmit a command signal from the module 30 to an adjacent module which indicates whether the control circuitry of that adjacent module should operate in an accumulation or a release mode. Moreover, these interfaces can be utilized to pass wakeup signals from upstream to downstream modules, indicating that an article is present in the upstream module and that the downstream module should then "wake up" from the sleep mode if it had entered the sleep mode. Finally, if desired, these interfaces could be utilized to transmit the status of actuation signals and/or product detection signals from one module to another.

Also included with the control module 30 are input devices in the form of configuration switches 48 which allow the user to set various parameters and/or modes of operation of the control circuit of the module. For example, the switches 48 can comprise DIP switches which allow the user to control the operation of the control module. Selectable features that may be provided with the controller 30 include multiple release modes, sleep mode, timer delay, and/or other user selectable features that are desired to be programmed into the control circuitry of the module. In one embodiment, the switches can be utilized to enable or disable a sleep mode of operation for each of the two zones controlled (which stops the zone when the sensor for the zone has been clear for a predetermined period of time, to reduce noise and wear to the system), to set a timer delay feature (which will delay the realization of an accumulation signal, in the event that signal later quickly switches to a release signal), and/or to configure the release mode for the two zones to be controlled (i.e., to determine whether each of the outputs 36, 38 will be controlled according to a singulation mode, wherein articles are separated by a one zone distance when they are moved, or according to a multi-slug mode, wherein some articles are not separated when they are moved.) As an example, twelve switches 48 can be provided for controlling these features. The following table indicates how such switches 48 can be set for controlling various features, wherein Zone A refers to one of the outputs 36, 38 for controlling an actuator of one of the zones (e.g., an upstream zone), and wherein Zone B refers to the other of the outputs 36, 38 for controlling another actuator of another of the zones (e.g., a zone adjacent and downstream of the upstream zone).

| Switch Number | | | | | | | | | | | | |
|---|---|---|---|---|---|---|---|---|---|---|---|---|
| 1 | 2 | 3 | 4 | 5 | 6 | 7 | 8 | 9 | 10 | 11 | 12 | Function |
| — | | | | | | | | | | | | Zone "A" operates in singulation mode |
| X | | | | | | | | | | | | Zone "A" operates in multi-slug mode |
| | — | | | | | | | | | | | Upstream slug override enabled |
| | X | | | | | | | | | | | Upstream slug override disabled |
| | | — | | | | | | | | | | Zone "B" operates in singulation mode |
| | | X | | | | | | | | | | Zone "B" operates in multi-slug mode |
| | | | — | | | | | | | | | Upstream slug override enabled |
| | | | X | | | | | | | | | Upstream slug override disabled |
| | | | | — | | | | | | | | Pass-thru disabled |
| | | | | X | | | | | | | | Pass-thru enabled |
| | | | | | — | | | | | | | Reserved |
| | | | | | X | | | | | | | Reserved |
| | | | | | | — | | | | | | Snooze mode disabled |
| | | | | | | X | | | | | | Snooze mode enabled |
| | | | | | | | | | | — | — | Block delay Timer value 1 |
| | | | | | | | | | | X | — | Block delay Timer value 2 |

-continued

| \multicolumn{12}{c|}{Switch Number} | |
|---|---|---|---|---|---|---|---|---|---|---|---|---|
| 1 | 2 | 3 | 4 | 5 | 6 | 7 | 8 | 9 | 10 | 11 | 12 | Function |
|   |   |   |   |   |   |   |   | — | X |   |   | Block delay Timer value 3 |
|   |   |   |   |   |   |   |   | X | X |   |   | Block delay Timer value 4 |
|   |   |   |   |   |   |   |   |   |   | — | — | Clear delay Timer value 1 |
|   |   |   |   |   |   |   |   |   |   | X | — | Clear delay Timer value 2 |
|   |   |   |   |   |   |   |   |   |   | — | X | Clear delay Timer value 3 |
|   |   |   |   |   |   |   |   |   |   | X | X | Clear delay Timer value 4 |

These switches include switches for selecting singulation or multi-slug mode for each zone controlled; the singulation mode will only power the zone if the downstream zone is clear, while the multi-slug mode will power the zone continually. Also, a slug override signal can be provided where the zones are continually powered regardless of any other signals received, and the switches can indicate whether that signal is to be utilized. In addition, a pass-thru feature can be selected by the switches where a zone can be disabled. Also, the switches can be utilized to indicate whether the zones should be operated in a snooze or sleep mode, if products are not detected for a period of time. Furthermore, the switches can be utilized to set timers to delay the utilization of an article detection signal indicating whether a zone is cleared or blocked. In this example, the signal indicating the zone is clear can be delayed for a selectable time, and the signal indicating a zone is blocked can be delayed for a selectable time.

The illustrative control module 30 of FIG. 1 can also include other components within the module housing 31. For example, a control circuit 50 can be provided which is in communication with the sensors inputs 40, 42 as well as the communication interfaces 44, 46, and which controls the actuation signals which are provided at the outputs 36, 38. Moreover, this control circuit 50 can be in communication with the configuration switches 48 or other suitable user input device for allowing the user to control the operation of the circuit 50. The circuit 50 can comprise any suitable microcontroller, computer, microprocessor, application specific integrated circuit, programmable logic circuitry, and/or other appropriate electrical or electronic components. Moreover, the circuit 50 can operate according to a configured logic (e.g., program, algorithm, software, and/or firmware.)

In this example, the control circuit 50 independently controls each of the outputs 36, 38 via valves 52 and 54 which are also provided within the housing 31. The valve 54 controls the flow of air from the supply input 32 to the valve output 36, while the valve 52 controls the flow of air from the supply input 32 to the valve output 38. These valves can comprise solenoid or two-position valves which block the flow of air to the respective output when in the de-energized state. Other types of valves and configurations are possible as well.

In operation, the module 30 is connected to an adjacent upstream module (if any are used) via the interface 44 and to an adjacent downstream module (if any are used) via the interface 46. Moreover, the sensors for the two zones which are to be controlled by the module 30 are connected via the inputs 40 and 42. In addition, the pneumatic supply is provided to the input 32 and is passed to the next module via the output 34. Finally, the output 36 is connected to an actuator (e.g., clutch) for engaging the driving force with the conveying element (e.g., rollers) of the first zone to be controlled, and the output 38 is connected to an actuator for engaging the driving force with the conveying element of the second zone to be controller. The switches 48 are set by the user for configuring the modes of operation, control features, and/or parameters of the module 30. The control circuit 50 then uses its programmed logic to control each of the outputs 36 and 38 independently, by controlling the valves 54 and 52 associated with those outputs.

Figure 2:
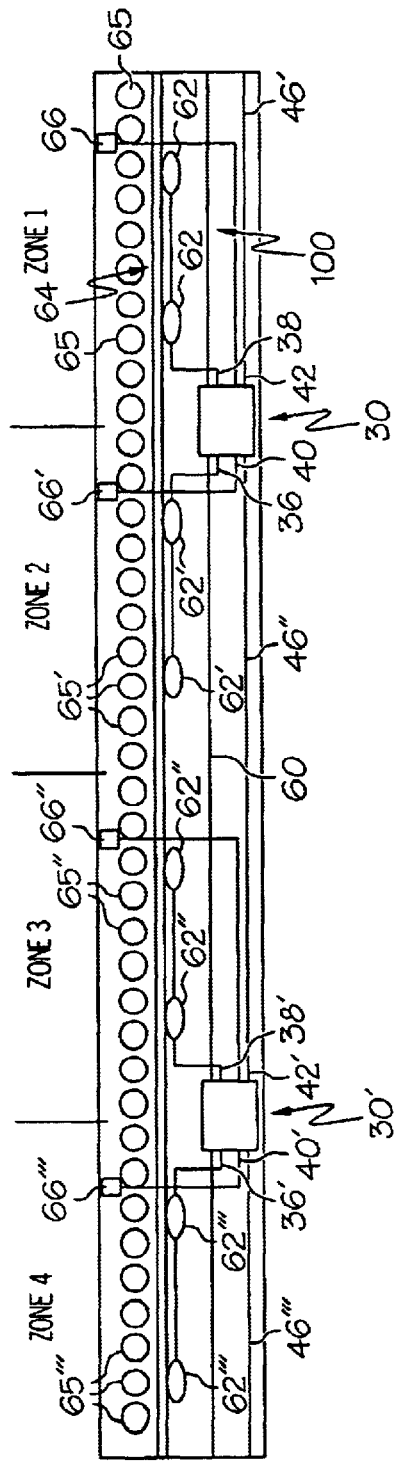
FIG. 2 is a schematic showing an illustrative embodiment of an accumulating conveyor system having multiple zones, a plurality of these zones being controlled by a single control module in accordance with particular principles of the present invention.

FIG. 2 is a schematic showing how similar control modules 30 and 30' can be connected in a serial manner to control a multiple zone conveyor system. In particular, the module 30 controls Zone 1 and Zone 2, while similar module 30' controls Zone 3 and Zone 4, which are upstream from Zones 1 and 2. The valve output 36' controls the actuators 62''' for Zone 4. These actuators cause a moving belt or chain 64 to selectively engage the rollers 65''' for that zone thereby allowing any articles located in that zone to be transported. Likewise, the valve output 38' controls the actuators 62'' for Zone 3 causing selective movement of the rollers 65'' for that zone. Moreover, the module 30 provides the valve outputs 36 and 38 which control the actuators 62' and 62 for Zones 2 and 1 respectively, and which thereby provide movement of the rollers 65' and 65 for those two zones. A supply of pneumatic pressure can be fed from module to module through hoses 60. The modules 30 and 30' are connected by communication cable 46'', and these modules further connect to other modules by cables 46''' and 46'. Accordingly, signals can be passed among the modules, such as article detection signals indicating whether articles are present in one or more downstream zones.

In particular, returning to FIG. 1, if a signal is received from a downstream module or control device via the connector 46, indicating that a product is present in the zone downstream to the two being controlled by the module 30, then the outputs 36 and 38 are controlled so as to accumulate products across the conveyor without causing the products to collide. During this "accumulation" mode, the first conveyor zone (Zone B), which is powered via the valve output 38 is continually powered by the control circuit 50 unless the downstream sensor, for the zone adjacent to the Zone B, indicates that there is a product present as indicated by the command signal received at input 46 (or, if sleep mode has been enabled by the configuration switches and that first zone has not had a product in it, as indicated by the article detection signal received at input 42, for a predetermined period of time). Likewise, during such an "accumulation" mode, the second conveyor zone (Zone A), which is powered via the valve output 36, is continually powered by the control circuit 50 unless the sensor for the first zone (Zone B) provides a signal at the input 42 indicating that there is a product present in that zone (or, if sleep mode has been enable and that second zone has not had a product in it, as indicated by a wakeup signal received via interface 44 for a predetermined period of time). Accordingly, the valves 54 and 52 are controlled via this logic to provide actuation signals from the outputs 36 and 38 to control the two conveyor zones during this accumulation mode of operation. The article detection signal for Zone B, provided at input 40 can be passed to the next upstream module via the interface connector 44, and that module can then operate in a similar manner.

Figure 3:
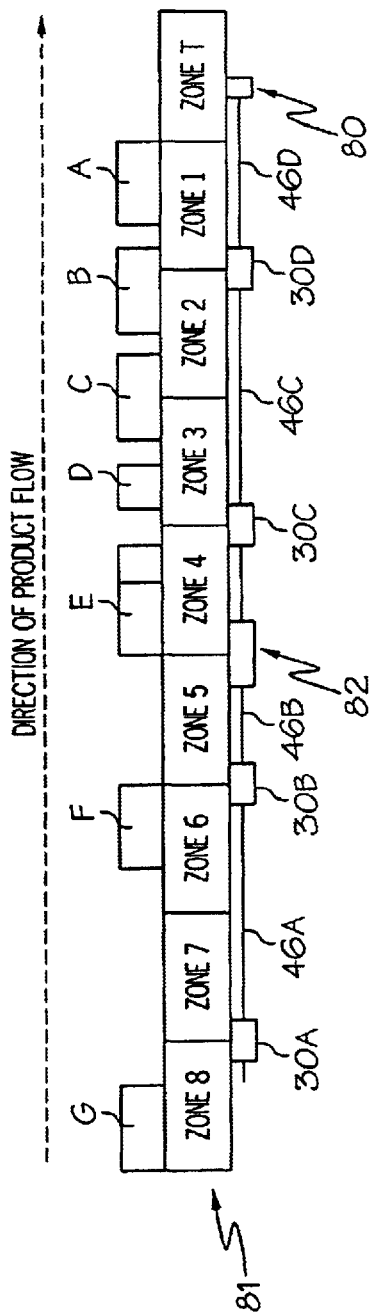
FIG. 3 is a schematic showing an illustrative embodiment of an accumulating conveyor system having multiple zones controlled by individual control modules, each operating in an accumulation mode, according to particular principles of the present invention.

Turning now to an illustrative accumulation mode, FIG. 3 is a schematic showing an illustrative embodiment of an accumulating conveyor system having multiple zones controlled by individual control modules, each accumulating products, according to principles of the present invention. In this example, to cause this accumulation, a relay 80 or other similar switch or control device is provided to generate a signal when it is desirable to enter the accumulation mode. In particular, when the items being conveyed are not being removed quickly enough from the take-away zone (Zone T), or if the place to which the items are being conveyed is not ready, or if the flow of items to Zone T otherwise needs to be halted, the relay 80 can be switched, either manually or automatically upon sensing a condition. The switching of the relay 80 then causes a signal to be provided to the module 30D through the cable 46D to the first article detection input of the module 30D, to indicate that the accumulation mode is desired.

Each of the control modules 30A–30D controls two conveyor zones in this example. In particular, control module 30A controls Zone 8 and Zone 7, control module 30B controls Zone 6 and Zone 5, control module 30C controls Zone 4 and Zone 3, and control module 30D controls Zone 2 and Zone 1, and these modules are connected in series or in a daisy chain fashion across the length of the conveyor 81. When each control module 30 receives this accumulation command signal indicating the presence of an article in the upstream zone of the downstream module, its control program or control logic accumulates products. In this mode of operation, the conveying elements (e.g., rollers) for each zone are always powered except for when the photo eye for the zone downstream from that zone is blocked (and, if the sleep mode is being utilized, except for when the sleep mode has been entered due to an absence of an item in that zone for a predetermined period).

In the example shown in FIG. 3, the release relay 80 has been switched to indicate that the modules 30 should accumulate the products. Items have continued to accumulate and have blocked photo eyes placed toward the downstream end of Zones 1, 2, 3, and 4. In this example, the module 30D has stopped the conveying elements of Zone 1 due to the switching of the relay and Zone 2 due to the presence of the article in Zone 1, and module 30C has stopped the conveying elements of Zone 3 due to the presence of an item in Zone 2, and has stopped the conveying elements of Zone 4 due to the presence of an item in Zone 3. Zone 5 is also stopped by the control module 30B due to the presence of the item in Zone 4.

However, module 30B continues to drive Zone 6 because no item is sensed in Zone 5. Likewise, module 30A stops driving Zone 7 due to the presence of the item in Zone 6, but continues driving Zone 8 due to the absence of a item in Zone 7. Accordingly, the item in Zone 6 will be driven onto Zone 5 and the inertia of the item and rollers will carry it in front of the sensor in Zone 5; Zone 6 will then stop driving. The item in Zone 8 will be carried under power to Zone 7 which will then become powered when the Zone 6 has an absence of items, thereby further carrying that item on to Zone 6. Thus, the items will line up in a row from Zones 1 through 6, without any zone spacing between the items. Zone 7 at that point will be stopped by module 30A due to the presence of the article in Zone 6, but Zone 8 will continue to be powered by module 30A due to the absence of an article in Zone 7. In this manner, the items are not pressed against one another during the downstream delay, and the conveyor 81 operates as a zero pressure accumulation conveyor.

Depending on conveyor speed and/or user preference, on/off delay timers may be activated for each photo eye and valve combination. The use of timers can delay the deactivation of the zone after a carton has blocked a downstream photo eye. This in turn will allow the item to travel further before it stops, reducing the gaps between the cartons. The timers can be optimized for various conveyor speeds. A power supply module 82 can also be utilized for delivering power to the various modules. The power supply 82 can be situated with approximately the same number of modules 30 on either side of it, in order to minimize voltage drops in the power delivery cable.

Figure 4:
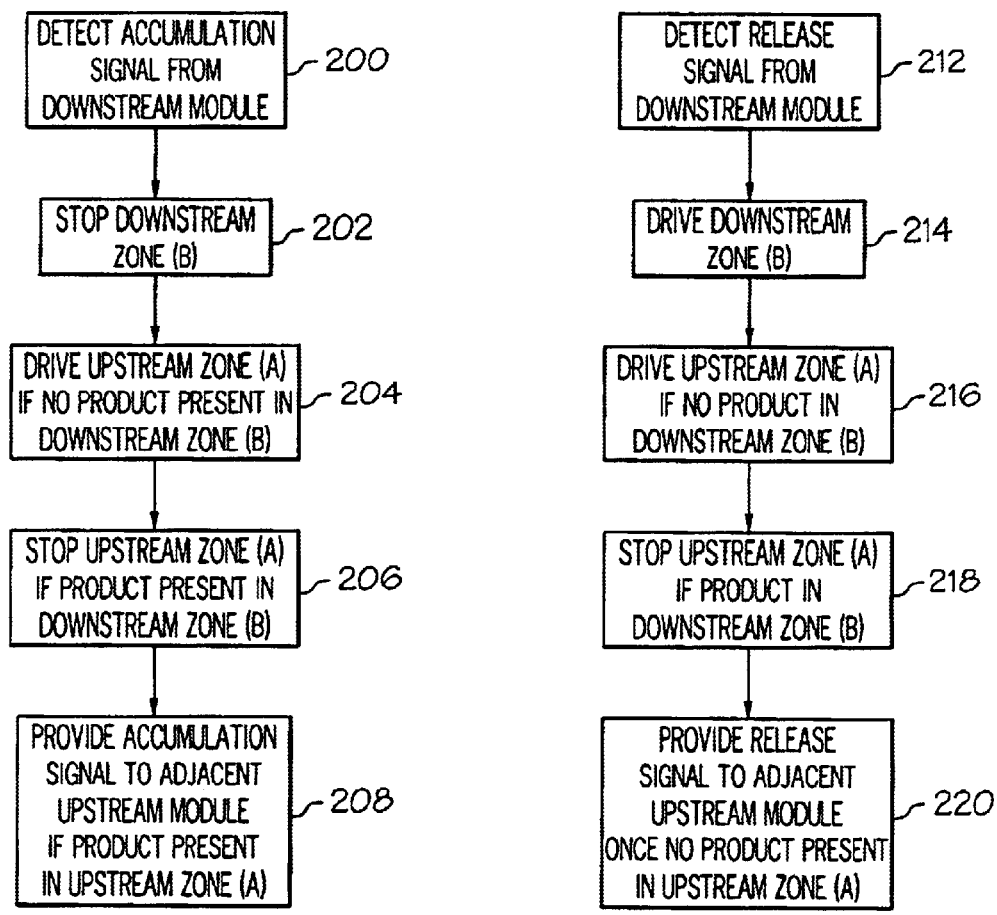
FIG. 4 is a flow diagram showing an illustrative method to be utilized by a programmed module for controlling multiple zones during an accumulation mode, according to particular principles of the present invention.

FIG. 4 shows an illustrative accumulation mode of operation conducted by a given control module, which controls a downstream zone (Zone B) and an upstream zone (Zone A). In this example, all modules operate in the accumulation mode in the same manner, regardless of the settings/programming for their release mode. Here, an accumulation signal is received by this module from the downstream module (or relay) indicating a product is present at the upstream zone controlled by the downstream module and that products are to accumulate, as shown at block 200. (The signal can be provided at the communication interface for the module). This signal causes the downstream zone B to be stopped by the present module, as shown at block 202. Similarly, at blocks 204 and 206, the upstream zone A is driven if no product is detected in the downstream zone, but the upstream zone A is stopped if a product is present in the downstream zone B. The accumulation signal is then passed to the next adjacent upstream module, as shown at block 208, once a product is present in the upstream zone (Zone A). Thus, the accumulation/release command signal sent by a module can simply comprise the presence or absence of an article in the upstream zone (Zone A) controlled by that module. While that article detection signal is not used by the module, it is passed to the next module as a command signal to indicate the presence or absence of a product in that zone and thus to indicate whether that upstream module should accumulate or release products. Other options are also possible, such as by directly wiring that sensor output to the upstream module rather than passing the signal.

Figure 5:
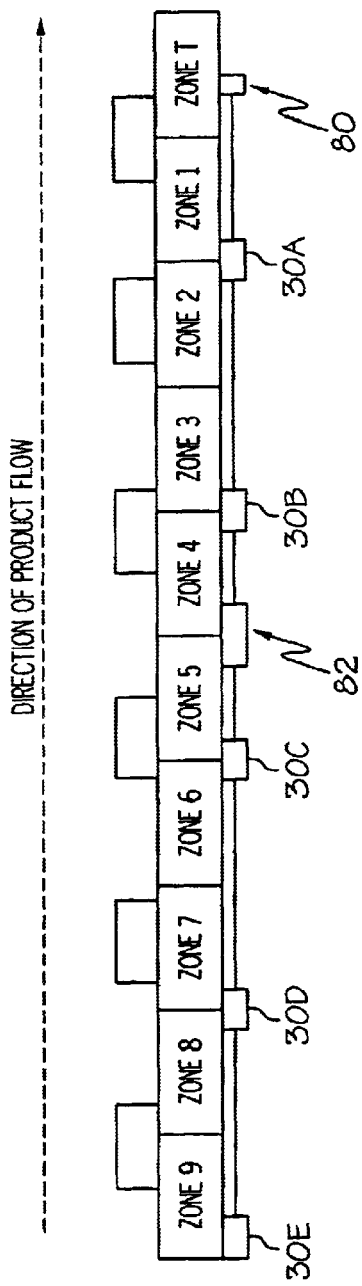
FIG. 5 is a schematic showing an illustrative embodiment of an accumulating conveyor system having multiple zones controlled by individual control modules, each operating in a singulation release mode, according to particular principles of the present invention.

Once the conveyor is to continue transporting items, the release relay can be switched to the release position, thereby causing the furthest downstream module of the system to enter the release mode. The manner in which that module begins transporting or "releasing" items will then depend on the release mode that has been programmed or selected (e.g., via switches) for each of these modules, and, in particular, for each zone to be controlled by each of those modules. In the example shown in FIG. 5, all of the modules 30A–30E have been programmed for singulation release mode for each of the zones controlled by each of these modules. Module 30E has been programmed to control Zone 9 in the singulation release mode, while the other control zone for this module has been disabled, because an odd number of zones is present. By disabling one of the actuation outputs of module 30E, the number of zones controlled by the modules will match the (odd) number of conveyor zones.

In singulation mode, a module releases items (i.e., begins to transport them again) but ensures that items are separated by an approximately one zone gap. To achieve this mode of operation, a module 30 ensures that the conveyor elements for both zones are always powered except for when the downstream photo eye is blocked, and except for when the zone is to enter sleep mode (if sleep mode is being utilized).

Thus, in the example of FIG. 3, if the release signal were provided by the relay 80 when the items were in the locations shown, then module 30D would power Zone 1 but would not power Zone 2 until the item A had cleared Zone 1. It would not provide a release signal to module 30C because of the presence of an item at Zone 2. Thus, module 30C would not power Zone 3 (until the item B had been powered off of Zone 2 and the release signal is provided from module 30D). Also, module 30C would not power Zone 4 until the items D and C had cleared Zone 3. Continuing with the example, module 30B would not power Zone 5 until the item E had been powered off of zone 4 and the corresponding release signal is sent from module 30C, but it would immediately power Zone 6 because no item is present in Zone 5. Finally, the module 30A would not power Zone 7 until item F had been powered off of Zone 6 and a corresponding release signal is then sent from module 30B, but it would immediately power Zone 8 because of the absence of an item in Zone 7. The resulting release of the items in this singulation release mode causes a flow similar to that shown in the example of FIG. 5, where items are separated by one zone gaps.

FIG. 6 is a flow diagram showing an illustrative method to be utilized by a programmed multi-zone control module for controlling multiple zones during a singulation mode, according to principles of the present invention. In this example, the release signal is detected from the downstream module indicating that the module is to enter the release mode of operation due to the absence of a product at Zone A of that module, a shown at block 212. In this case, the method shown relates to a module that has been programmed (or has been configured by the user) to operate in the singulation mode for both control zones during release mode. At block 214, the downstream zone (B) of the two zones controlled by this module is driven in response to the release signal. The upstream zone (A) controlled by the module is driven by the module if there is no product detected by the sensor in the downstream zone (B), as shown at block 216. However, the upstream zone is not driven by the module if there is a product present in the downstream zone (B), as shown at block 218. The release signal is passed from this module to the next upstream module once no product is present in the upstream zone (A), as shown at block 220 (i.e., the signal indicating the absence of an article in zone A is passed to the next module as a release signal).

Figure 7:
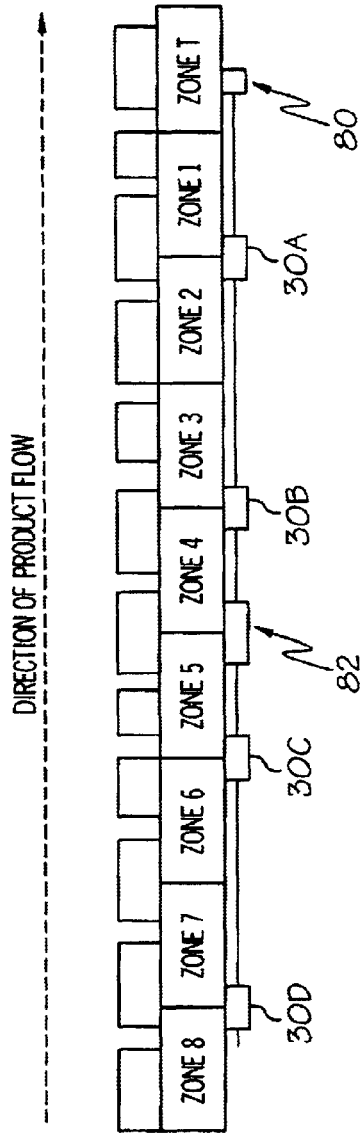
FIG. 7 is a schematic showing an illustrative embodiment of an accumulating conveyor system having multiple zones controlled by individual control modules, each operating in a slug override mode, according to particular principles of the present invention.

Other additional or alternative release mode options are also possible. For example, FIG. 7 shows an illustrative slug override mode, wherein items are conveyed without any zones separating them, for greater throughput. In this mode of operation, each module powers both zones that it controls once a slug override signal is received. In the example shown in FIG. 7, module 30A controls both Zone 1 and Zone 2, module 30B controls both Zone 3 and Zone 4, module 30C controls both Zone 5 and Zone 6, and module 30D controls both Zone 7 and Zone 8. This slug override signal can override the accumulation/release signal received, and power all zones such that the items can be transported without any zone spacing.

Figure 8:
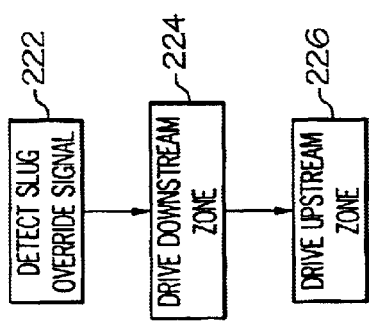
FIG. 8 is a flow diagram showing an illustrative method to be utilized by a control module for controlling multiple zones during a slug override mode, according to particular principles of the present invention

FIG. 8 shows an illustrative method of operation for a module operating in such a slug override mode for both of the zones it controls. In particular, at step 222, the slug override signals is provided. (This signal can be provided to all zones at once by direct communication or by passing the signal serially through the modules). In response to this signal, both the upstream and the downstream zones are powered by this single module, as shown at blocks 224 and 226.

Figure 9:
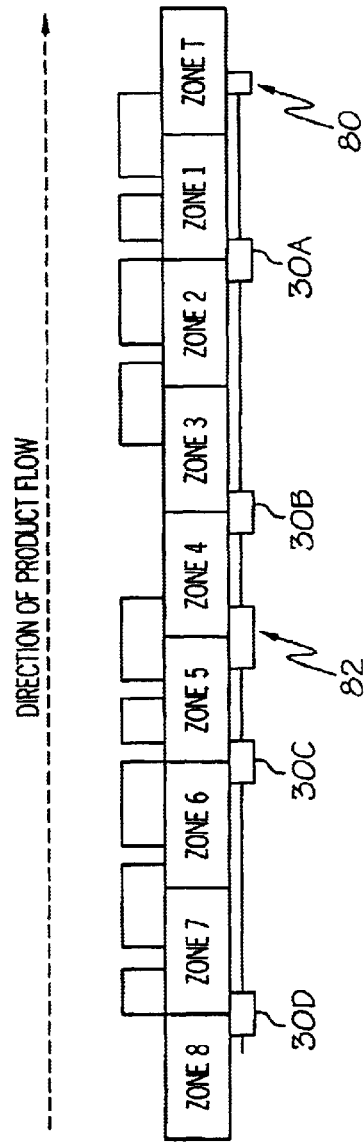
FIG. 9 is a schematic showing an illustrative embodiment of an accumulating conveyor system having multiple zones controlled by individual control modules operating in a multi-slug release mode, according to particular principles of the present invention.

FIG. 9 illustrates a multi-slug release mode of operation, which can be used as an alternative programmed or selectable release mode. In this example, each of the modules are configured to control both zones in a multi-slug mode, except for the module which is to provide a one zone separation (i.e., the module that controls the zone which is to be the end or termination of one of the multiple "slugs," each slug being a continuous section of items.) In this example, module 30A is programmed (or defined by the user) to operate in a multi-slug/multi-slug mode of operation for the two zones (Zones 1 and 2) that it controls. In such a configuration, upon detection of the release signal from the relay 80, these two zones will be continually powered and the module will immediately pass the release signal to the next module. However, module 30B is programmed or defined to operate in a singulation/multi-slug mode, meaning that Zone 4 (the slug terminator) will be operated by that module in a singulation mode, while Zone 3 will be operated in a multi-slug mode. Thus, Zones 3 and 4 will be continually powered upon receipt of the release signal, but the release signal will not be passed by module 30B to the next module (module 30C) until a product is not present in Zone 4.

Similarly, module 30C is operated in a multi-slug/multi-slug mode and will operate both zones upon receipt of the release signal and will then pass that signal to the next module immediately, but module 30D is programmed to operate one zone (Zone 7) in a multi-slug mode and the other zone (Zone 8) in a singulation mode. Thus, Zones 5, 6, are continually powered during release and module 30C immediately passes the release signal to module 30D. Module 30D, on the other hand, powers its zones upon receipt of the release signal but waits until product is clear from Zone 8 before providing the release signal to the next upstream module.

Figure 10A:
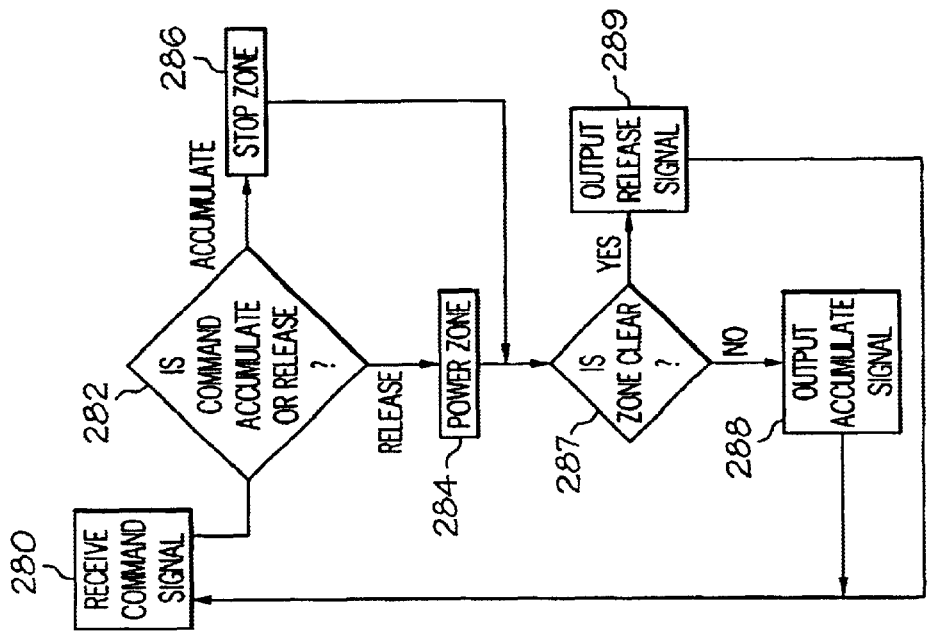
FIG. 10a shows an illustrative singulation method of operation for controlling a conveyor zone.
Figure 10:
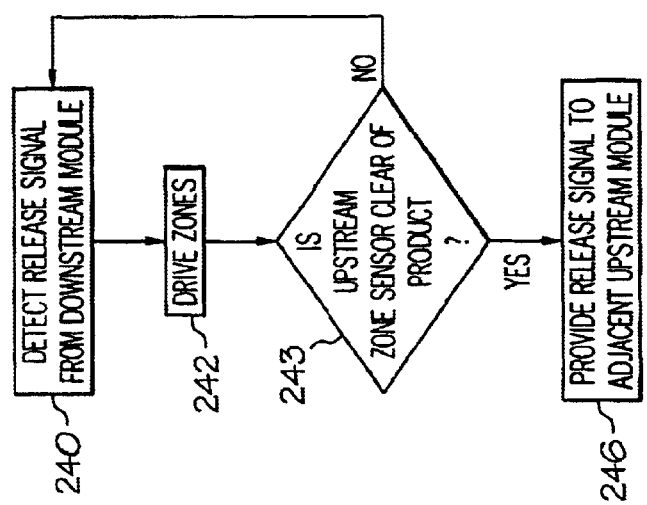
FIG. 10 is a flow diagram showing an illustrative method to be utilized by a control module for controlling multiple zones during a multi-slug mode, according to particular principles of the present invention.

FIG. 10 shows an illustrative method of operation of a module that is operating in a combined singulation/multi-slug mode, so as to provide multiple groups or "slugs" of items as they are released. In this example, the module is programmed or configured such that the downstream zone is operated in multi-slug mode, but the upstream zone is operated in singulation mode. (In the example given above with respect to FIG. 1, this could be achieved by setting Zone A to singulation mode by setting its switches, and by setting Zone B to multi-slug mode by setting its switches.)

In this example, at block 240, a release signal is detected from a downstream module causing the module at issue to enter the release mode. The zones are then driven, as shown at block 242. However, because the upstream zone is being controlled in singulation mode, then the release signal is not provided to the adjacent upstream module until the sensor for that upstream zone is clear, as shown at blocks 243 and 246.

Figure 10B:
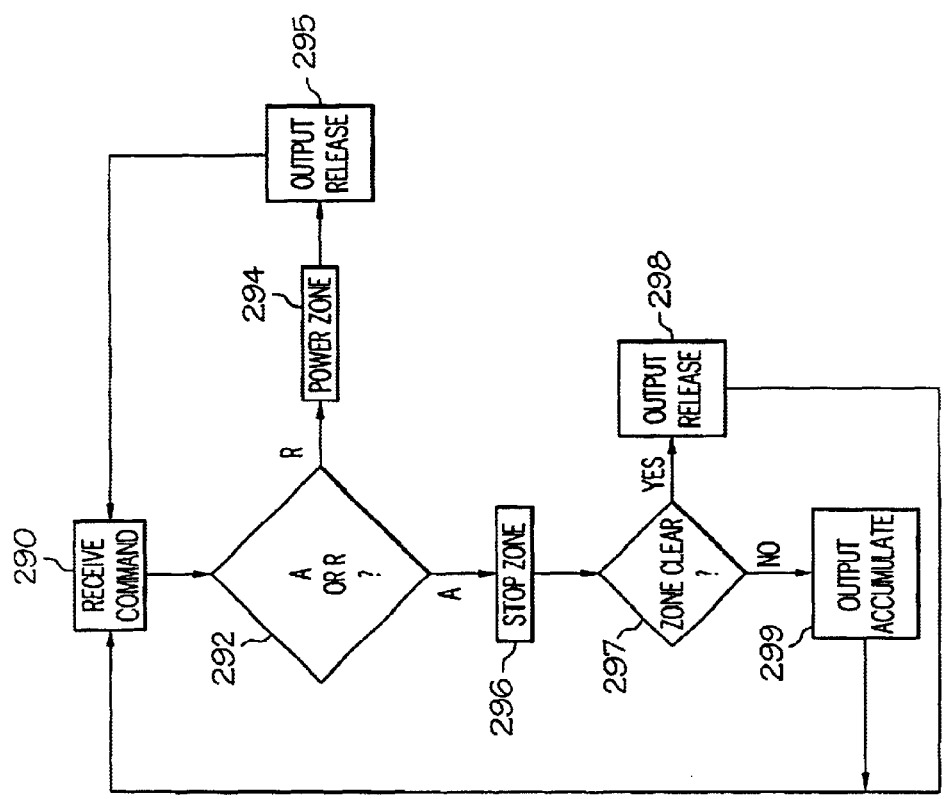
FIG. 10b shows an illustrative multi-slug method of operation for controlling a conveyor zone.

For further explanation of these illustrative embodiments, FIGS. 10a and 10b are provided. In particular, each control module could execute separate algorithms for each of the two zones it controls—one algorithm controls the upstream zone (Zone A), while the other controls the downstream zone (Zone B). In this example, two possible algorithms can be executed for each zone to be controlled by the module: a singulation algorithm and a multi-slug algorithm. FIG. 10a shows an illustrative singulation algorithm for controlling a given zone at issue. In particular, at block 280, a command is received from an algorithm controlling a downstream zone (which could be included in the same or different module, or the signal could be from a relay or other switch if this algorithm is for the furthest downstream zone). At block 282 it is determined if the command is an accumulate or release signal. If the release signal is received from that algorithm, then the zone is powered, as shown at block 284. If the accumulate signal is received, then the zone is stopped, as shown at block 286. Then, it is determined at block 287 if the zone controlled by this algorithm is clear (indicating no item present). If the zone is clear, then an accumulate signal is output to the algorithm for the upstream zone (which could be included in the same or different module), at block 288, but if the zone is not clear, then a release signal is provided to that algorithm at block 289. The algorithm then returns to block 280 to check the command signal received. However, for a zone being controlled by a multi-slug algorithm, a different method can be utilized as shown in FIG. 10b. In particular, this algorithm receives the command signal from the algorithm for the downstream zone (which again could be executed by the same or different module or the signal could be from a relay or other switch if this algorithm is for the furthest downstream zone) as shown at block 290. It is then determined at block 292 whether this command is an accumulate command or a release command. If it is a release command, then the zone being controlled is powered and a release signal is provided to the algorithm for the upstream zone, as shown at blocks 294 and 295. However, if the accumulate command has been received, then the zone is stopped, as shown at block 296. It is then determined at block 297 whether an item is present in the current zone controlled by this algorithm. If the zone is not clear of items, then an accumulate signal is provided to the next upstream algorithm, as shown at block 299, but if the zone is clear, then a release command is provided to that algorithm as shown at block 298. The method then returns to block 290 to analyze the next command received from the algorithm for the downstream zone. Thus, each zone being controlled can be controlled by one of these algorithms. As noted above, the user could select which zones are controlled by which algorithm, such as by using switches or other input devices for example, and can thereby create "slugs" from certain sections of the conveyor and one-zone separations at other sections of the conveyor. As mentioned above, other features can also be utilized with these algorithms.

Figure 11:
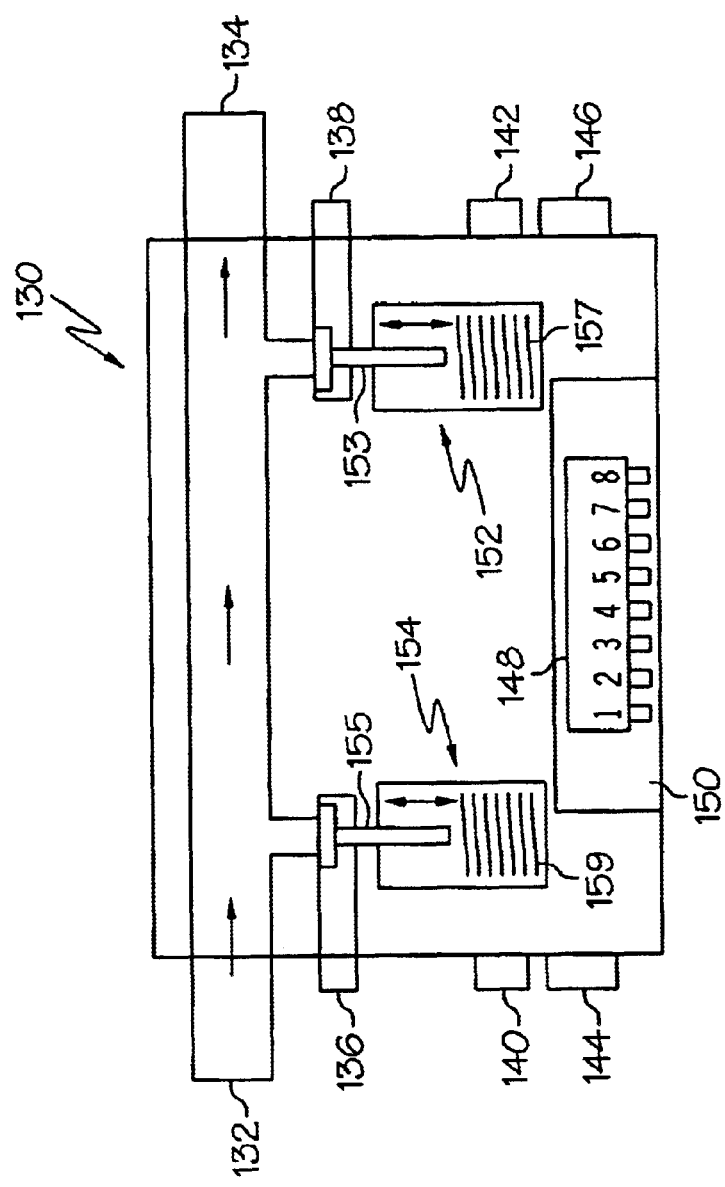
FIG. 11 is a cross-sectional view of an illustrative multiple zone controller module made according to particular principles of the present invention.
Figure 12:
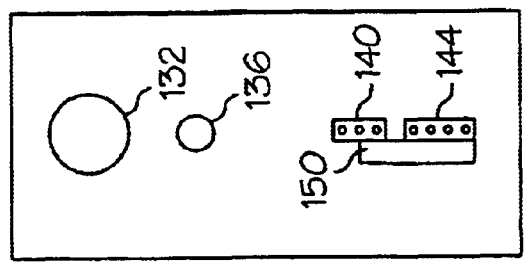
FIG. 12 is a left side view of the illustrative multiple zone controller module of FIG. 11.
Figure 14:
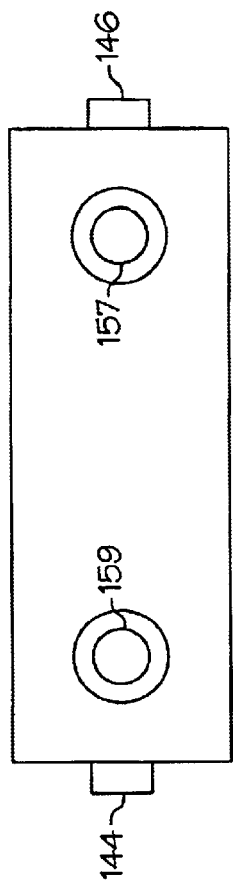
FIG. 14 is a bottom view of the illustrative multiple zone controller of FIG. 11.
Figure 13:
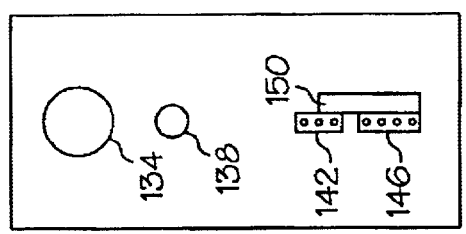
FIG. 13 is a right side view of the illustrative multiple zone controller module of FIG. 11.
Figure 16A:
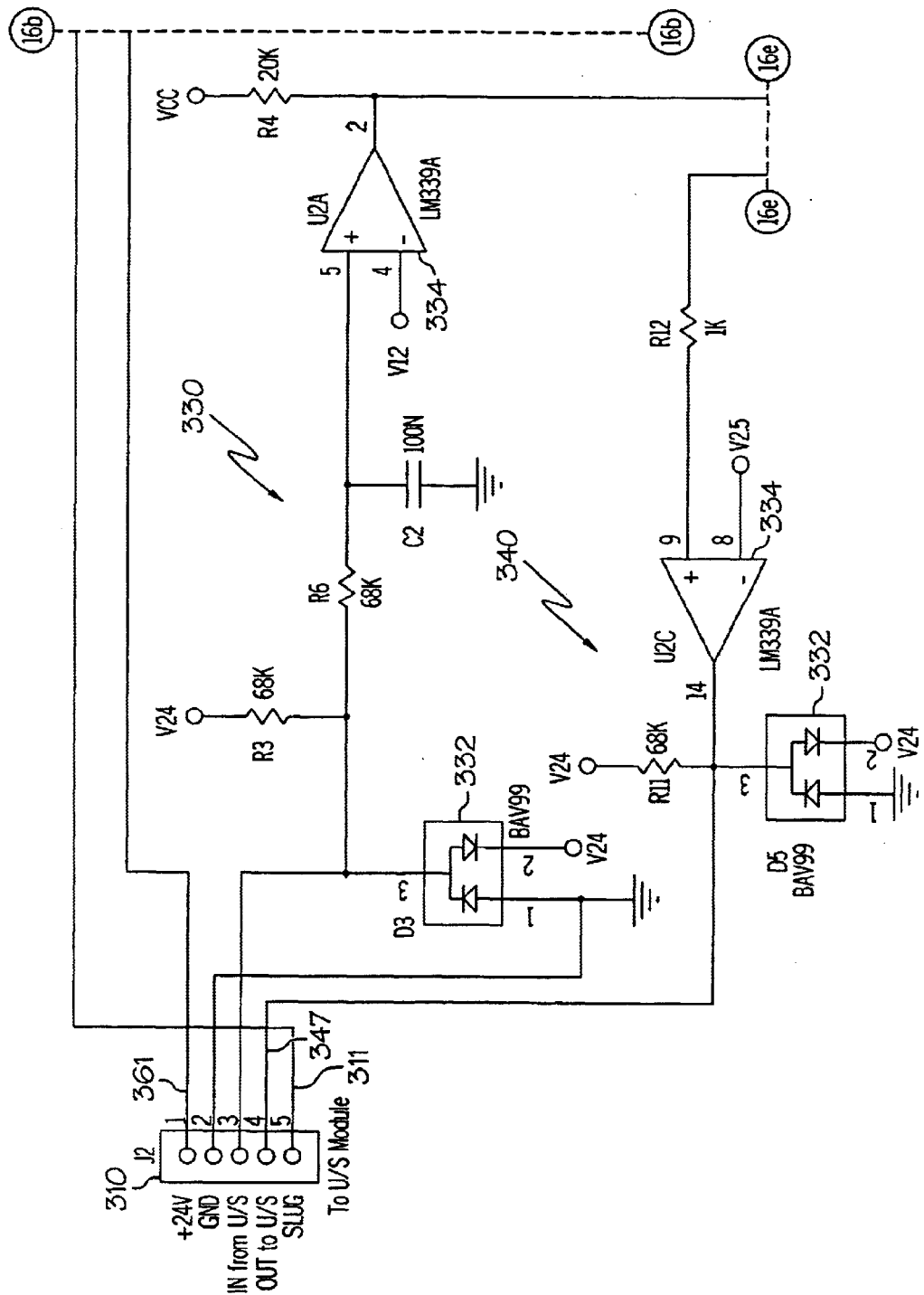
FIG. 16 is a schematic diagram showing an illustrative control circuit for use with a multiple zone controller module, such as that of FIG. 11, and made according to particular principles of the present invention.
Figure 16B:
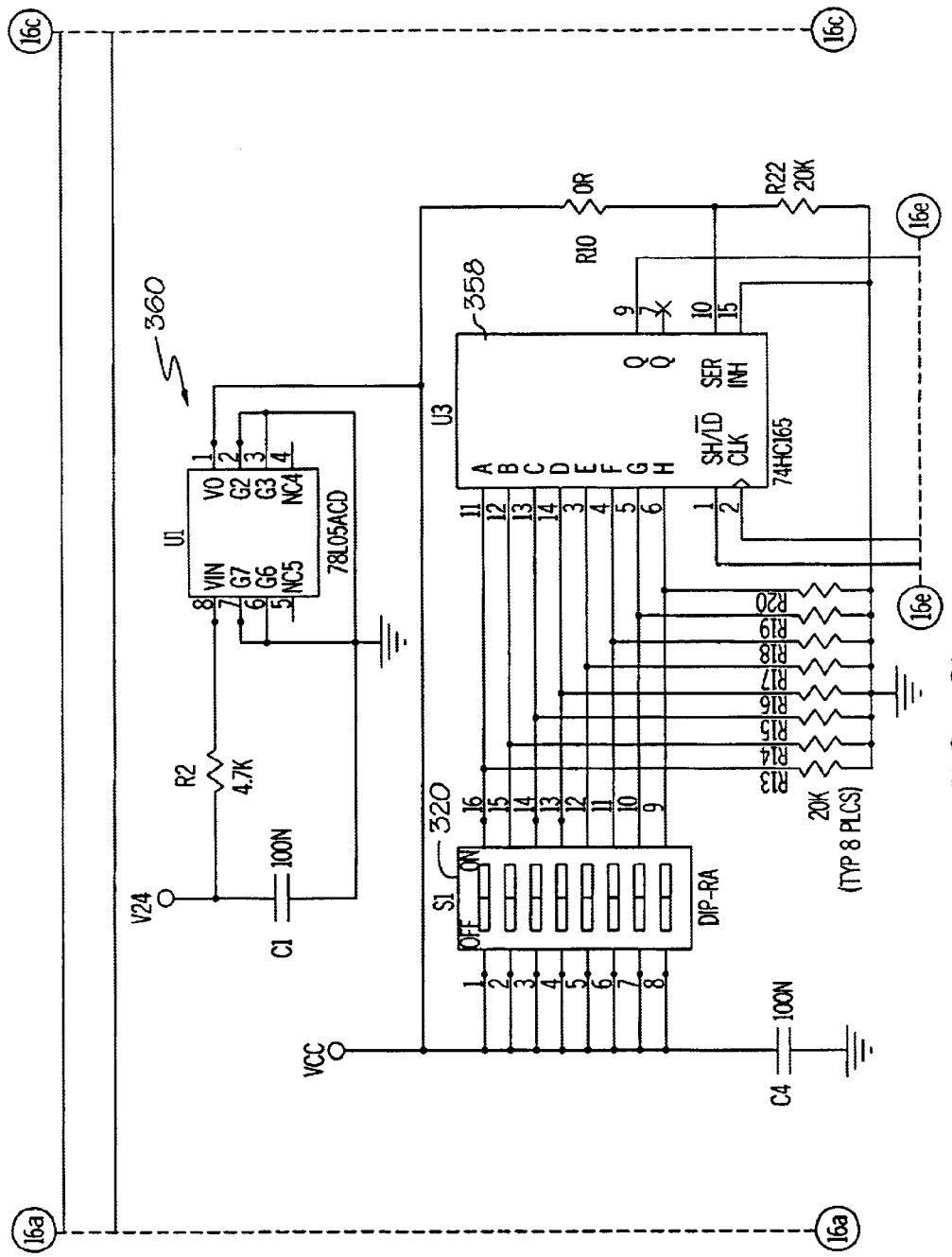
Figure 16C:
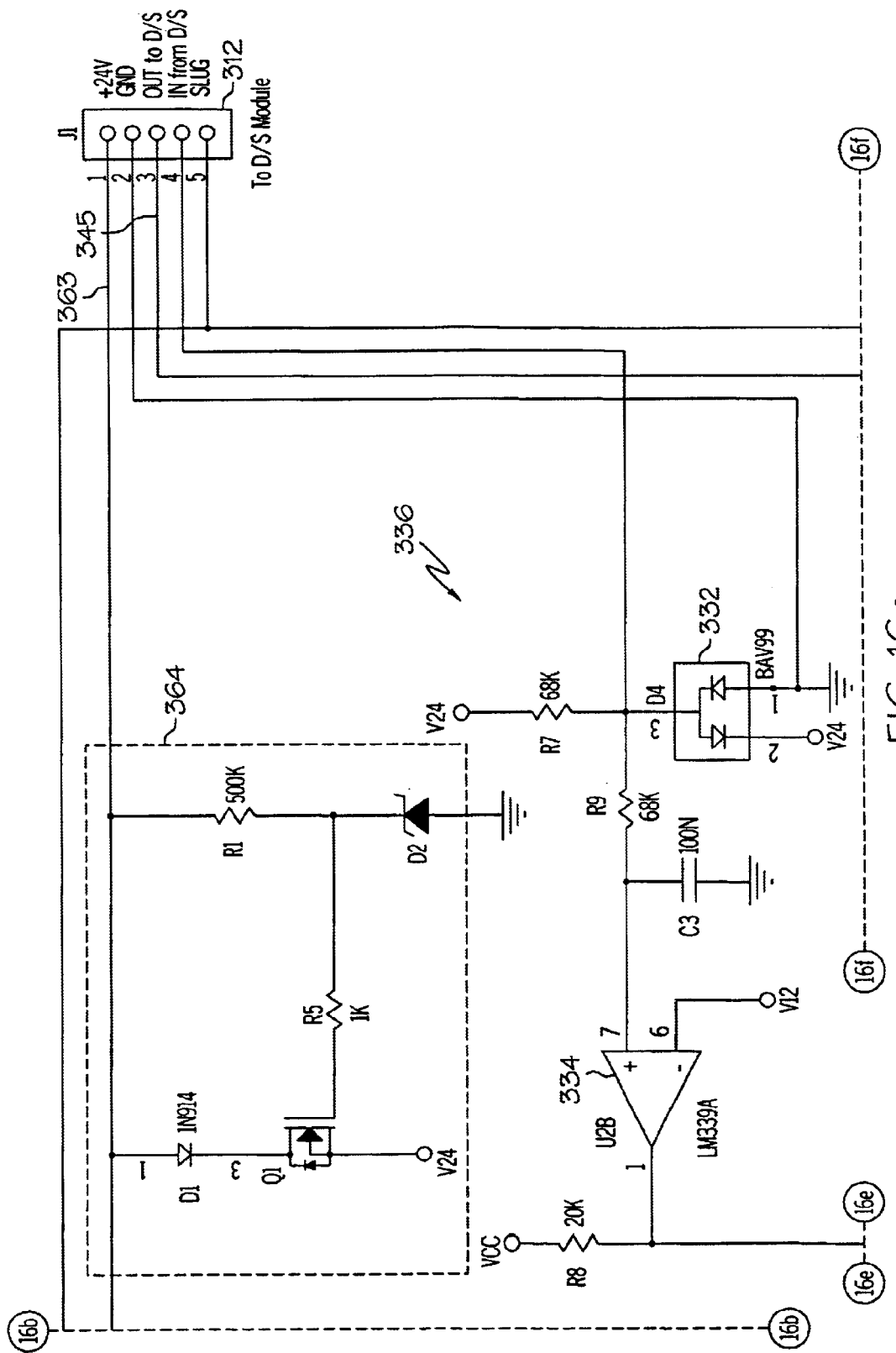
Figure 16D:
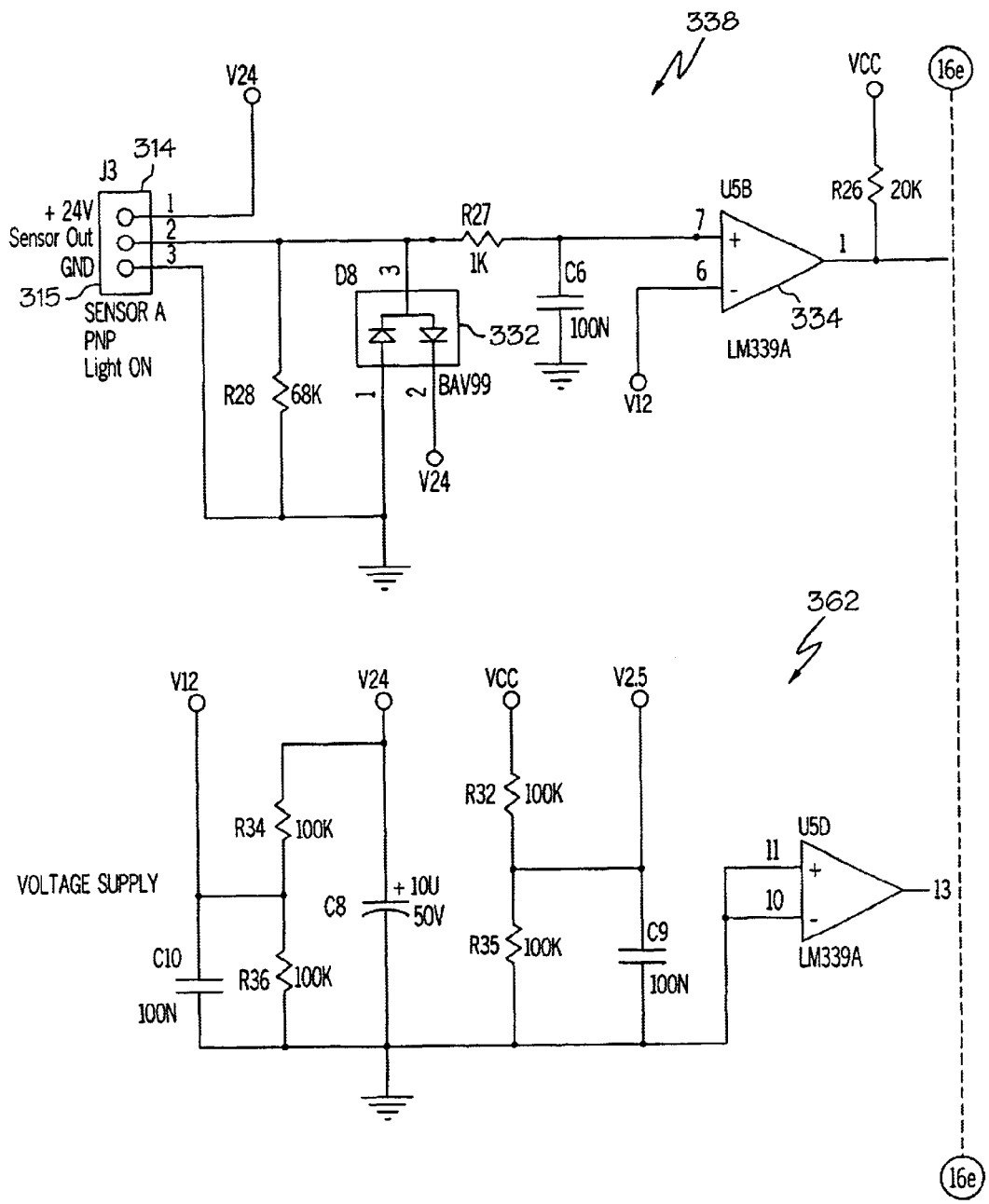
Figure 16E:
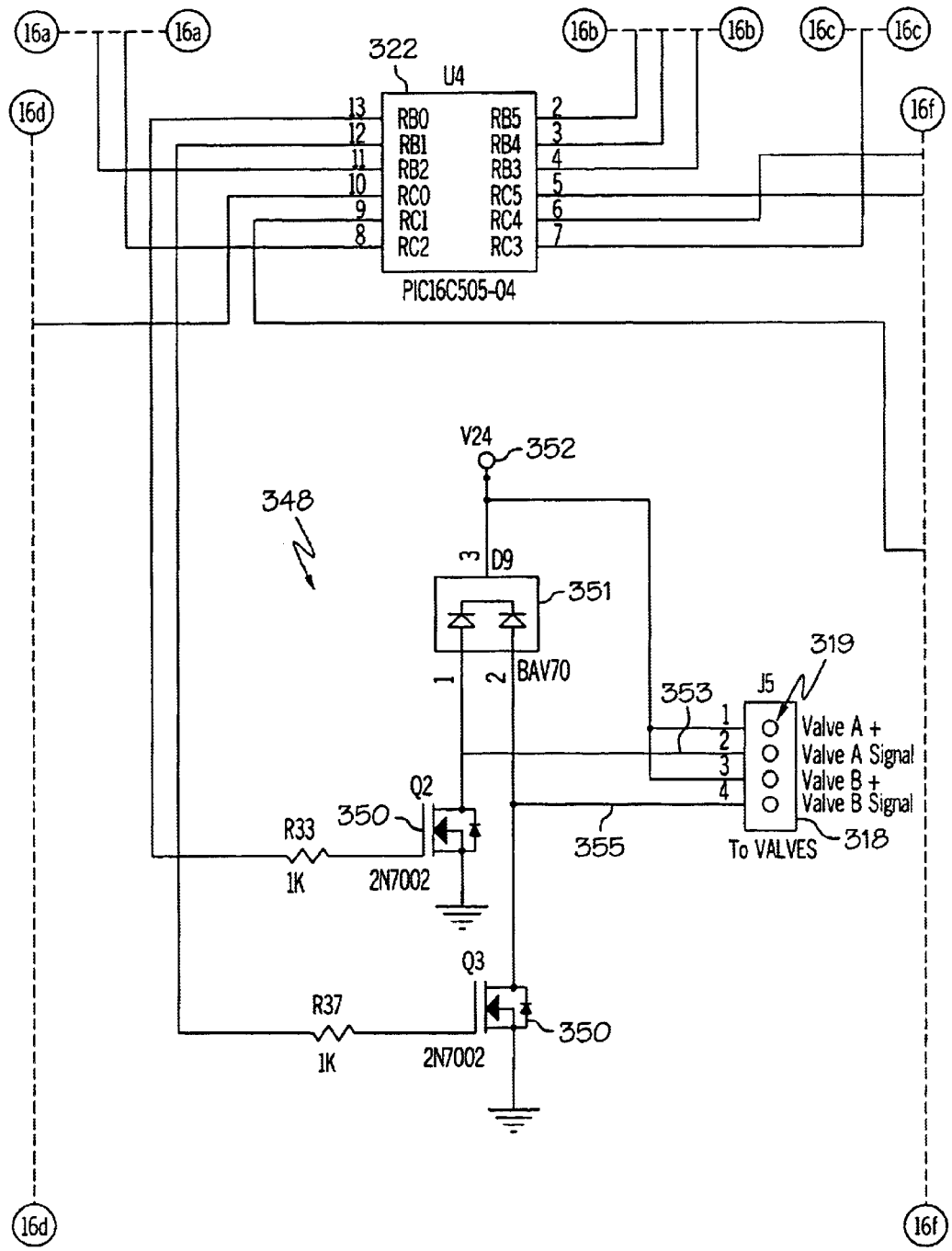
Figure 16F:
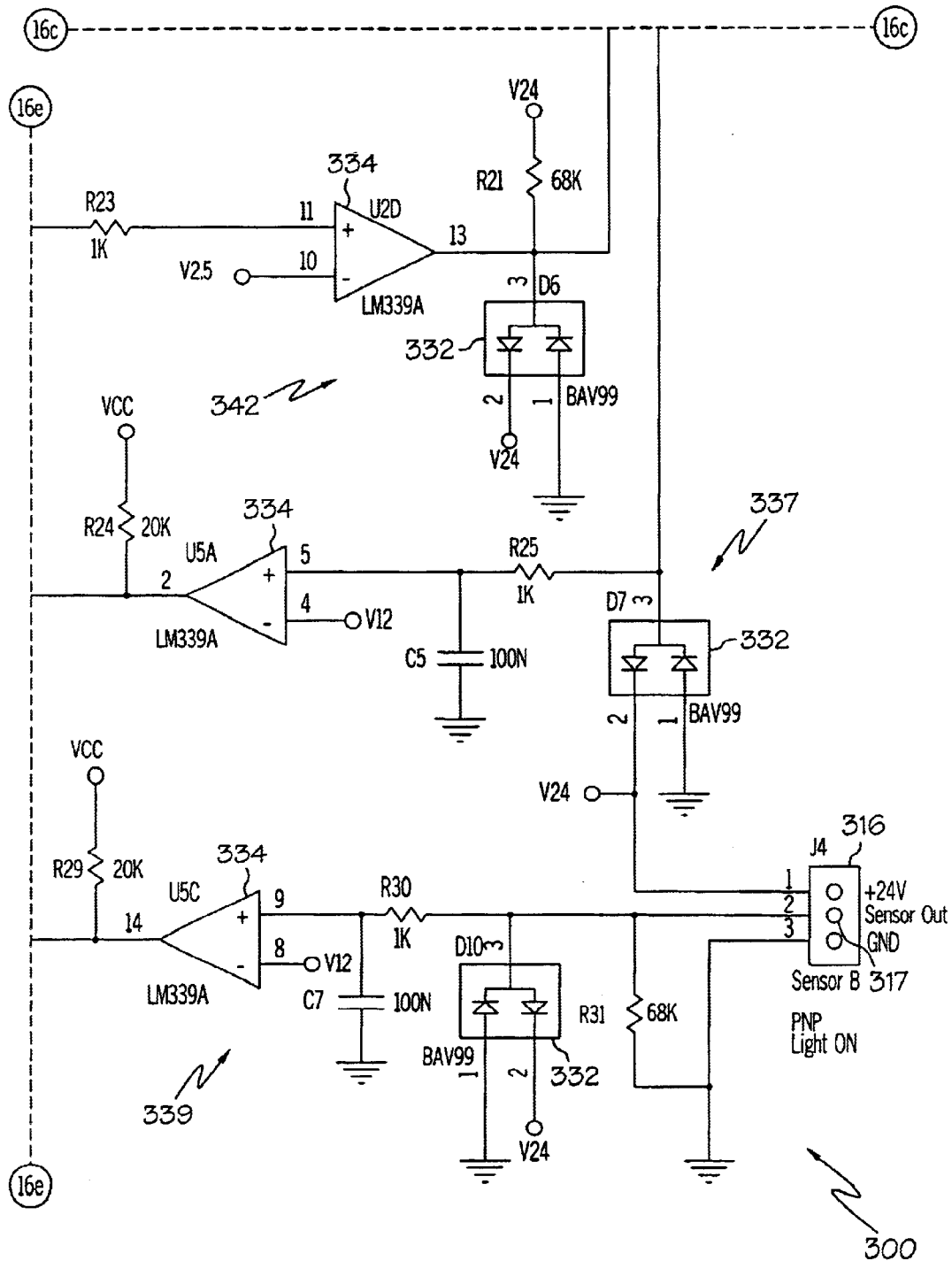

FIG. 11 is a cross-sectional view of an illustrative multiple zone controller module, such as that of FIG. 1 for example, made according to principles of the present invention. FIGS. 12, 13, and 14 show left, right, and bottom views of this illustrative embodiment.

According to this example, and with reference to FIGS. 11-14, the module 130 includes a pneumatic supply input/output 132 and a pneumatic supply input/output 134. Moreover, the module includes a pair of valves 154 and 152 for controlling pneumatic outputs 136 and 138 for selectively applying a pneumatic actuation signal through these outputs. The valves 152 and 154 each include a movable valve plunger (153, 155 respectively) which are used to open and close fluid communication between the pneumatic supply line and each of the outputs 136 and 138. The valves 152 and 154 can be any suitable valves for this purpose, such as solenoid valves for example. In this example, the valves 154 and 152 each include a coil (159 and 157 respectively) which, when energized with electrical current, cause the movement of the plungers 155 and 153. Each of these coils 157, 159 is individually controlled by the circuitry in the module 130, as will be described in further detail below. Accordingly, each output is 136 and 138 is independently controllable and each can thereby independently control a pneumatic actuator which causes conveyor rollers to engage or disengage from a driving force, in turn causing the rollers to either rotate or to stop.

In particular, a circuit board 150 can be provided for controlling the two valves 154 and 152 and for thereby controlling two zones or sections of a conveyor. This circuit board 150 can include control circuitry (e.g., electrical components, processors, controllers, logic components, electronic components, and/or integrated circuits) which carry out the logic, algorithm, program, software, and/or firmware for controlling the two valves 154 and 152. The control circuitry can include any other circuitry or components for receiving, conditioning, and/or providing signals for conducting this control function. Exemplary components and arrangements for inclusion in such control circuitry will be described in further detail below.

In addition, this circuit board 150 can be provided with communication interfaces for communication between module 130 and other adjacent modules. In the example of FIGS. 11–14, a communication port 144 is provided for communicating with an adjacent upstream module, and a communication cable 146 is provided for communicating with an adjacent downstream module. These communication interfaces can each be provided with one or more inputs and/or outputs (e.g., pins, wires, channels, connections etc.) for providing signals to these other modules. The signals provided can include article detection signals, release/accumulate signals, wakeup signals to indicate whether products are present in one or more zones of that module or another module, or actuation signals to indicate the status of one or more valves or other control devices for that module or another module, and/or other signals.

In addition, the board 150 can be provided with signals from the inputs 140, 142 which receive signals from sensors, each of which detects whether an item is present in a zone of the conveyor. The inputs 140 and 142 can be connected to the sensors for same two zones that are to be controlled by the module 130, or to other appropriate zones. The signals from the circuit board 150 could comprise electrical signals which control the valves 152, 154 and the actuation signals provided by these valves. However, the circuit board 150 could provide electrical actuation signals for controlling solenoids, switching devices, motors, and/or other electrically driven devices.

In addition, switches 148 can be provided on the circuit board 150 to configure the program of the circuitry of the board, such that the user can set one or more modes of operation to be executed by the control circuitry and/or one or more parameters to be used by the control circuitry. In this example, the switches 148 comprise eight DIP switches, although it should be understood that these switches could comprise any user input device, such as buttons, keys, touchscreens, wired and wireless programming units, and the like.

Figure 15:
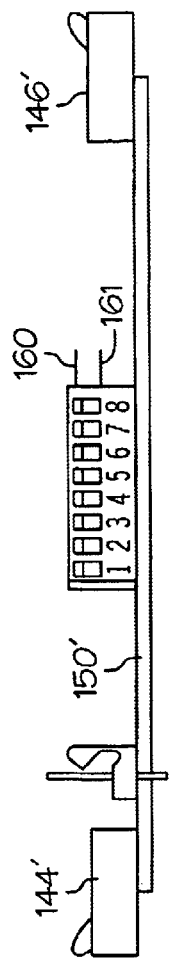
FIG. 15 is a bottom view of a conveyor zone circuit board having switches for setting parameters or modes of operation of the control circuit, at least one of the switches being settable to the conveyor speed according to particular principles of the present invention.

The switches can be utilized to set the modes/parameters discussed above, and can indicate the settings listed in the table shown above. However, other alternative or additional functionality can be provided by such input devices. For example, as shown in FIG. 15, at least one switch (or other input device) can be utilized to allow the user to define the speed (e.g., the exact speed, approximate speed, or speed range) at which the conveyor will operate. In this example, switch 8 is designated to indicate the speed of the conveyor. When the switch is in the position 160, it indicates that the conveyor will be running at a first speed, but when the switch is in the position 162, it indicates to the control circuitry 150 that the conveyor will be running at a second speed. Other switches or input devices could also be utilized, if additional speed settings are to be designated. For example, switches 7 and 8 could be utilized to designate four speed possibilities (both switches in position 160 indicating a first speed, both switches in position 161 indicating a second speed, switch 7 in position 160 and switch 8 in position 162 indicating a third speed and the reverse indicating a fourth speed.)

The control circuit 150 can then utilize the speed indications provided by the user to set at least one parameter which is utilized by the control logic. For instance, based upon the speed indication, the time or counter utilized in the time delay function can be set. In particular, a slower moving conveyor may need additional time delay before confirming that an event has occurred and/or that items are not entering a zone. Accordingly, a slower speed setting provided by a user may cause the time delay timer to count for a longer amount of time than if the user had selected a faster speed setting. As another example, the speed indication could be utilized to set a sleep mode timer or counter. In particular, it may be desirable to wait longer before entering a sleep mode for a slower moving conveyor than for a faster moving conveyor. Accordingly, a slower speed setting provided by a user may cause the sleep mode timer to count for a longer amount of time (after the absence of an article has been detected) before entering sleep mode than if the user had selected a faster speed setting. Other examples of modifying parameters, modes, settings and the like based upon the user defined speed settings are also possible.

Returning again to FIGS. 11–14, an illustrative mode of operation of the module 130 will now be described. The module can be connected to a pneumatic supply via input 132, and this supply can be provided to an adjacent module via the output 134. In addition, an article detection sensor (e.g., a photo-eye) can be connected to the input 140 to provide an article detection signal indicating whether an item is present in a first zone, and an article detection sensor can be connected to the second input 142 to provide a second article indicating whether an item is present in a second zone. Moreover, the module 130 can be connected to adjacent modules via the communication interfaces 144 and 146. If the module 130 is to be the first module (furthest downstream), cable 146 can be connected to a relay or the like, and if the module 130 is to be the last module (furthest upstream), the interface 144 can remain unconnected.

Output 136 can be connected via a conduit to an actuator so as to provide a first actuation signal, in this example a pneumatic actuation signal, which can cause the conveying elements of a conveyor zone to move or to stop. Likewise, output 138 can be connected to a second actuator so as to provide a second actuation signal, in this example a pneumatic actuation signal, which can cause the conveying elements of a second conveyor zone to move or to stop. In this illustrative embodiment, the actuation signals are controlled by the valves 154 and 152 which move the plungers 155 and 153. Each valve, in turn, is independently controlled by the control circuit on the control board 150. The control circuit executes a control algorithm (logic, program or the like) in order to control these valves 154 and 152, in response to the signals received from communication interface 144 and/or communication interface 146, and in response to (directly or indirectly) to the signals received at the inputs 140 and 142 from the sensors. In addition, the modes of operation to carry out this control algorithm, and/or the parameters used by this control algorithm, can be set by the switches 148, such as described above for example.

FIG. 16 illustrates an illustrative control circuit which can be utilized in each of the modules described above for controlling two zones of a conveyor in accordance with principles of the present invention. This example includes circuit components for receiving and transmitting signals at appropriate levels and formats, for receiving signals from a user input device, and for executing a control logic for independently controlling at least two zones of a conveyor.

More specifically, this illustrative control circuit 300 includes connectors 310 and 312 for providing signals to and receiving signals from adjacent modules via inputs and outputs. Moreover, the circuit includes connectors 314 and 316 for receiving signals from photo-electric article detection sensors via an input (315, 317). In addition, a connector 318 is provided to output independently controlled signals to two valves, each of which controls a zone, via the outputs 319 Moreover, user inputs in the form of switches 320 are provided to allow the user to define parameters to be used by the control circuit 300 and/or modes of operation of the same.

The control logic for the circuit 300 is executed by the controller 322, which can comprise any suitable microcontroller, processor, microprocessor, integrated circuit, gate array, logic component(s), or the like. The logic which is utilized can be stored in memory within the controller 322, such as in the form of firmware. However, separate external memory units, such as RAM, ROM, PROM, and/or EEPROM devices and the like could be utilized if appropriate.

Interface circuitry (e.g., converter circuitry, conditioning circuitry, transformation circuitry, signal processing circuitry, etc.) can also be included to allow the controller 322 to provide signals and to be provided signals at the appropriate levels and/or formats for the devices with which it will be used. In particular, interface circuitry 330 can be provided to receive an input signal from an upstream module, such as a signal which would indicate that a zone or zones controlled by circuitry 300 should "wake up" from sleep mode due to an incoming item. This circuitry 330 can include appropriate components such as switching diodes 332, comparators 334, and the like, for providing the signal at the correct amplitude and format for use by the controller 322. If it is desirable to provide additional inputs from the adjacent upstream module, additional similar interface circuitry 337 can be provided. In this instance, the input 311 is used to provide a user selectable slug override signal which causes all zones of all modules to be continually powered, without regard to accumulation, jam, sleep, release, or other signals.

Similar interface circuitry 336 is provided for receiving signals from the downstream module (or relay). Likewise, similar circuitry 338 and 339 is provided for providing signals from the two sensors.

Moreover, output interface circuitry 340, 342 can be provided to allow the controller 322 to provide output signals to adjacent modules at the proper voltage level. These signals allow the controller 322 to communicate with these other modules via outputs 345, 347, for passing accumulation/release command signals, wakeup signals and/or other status and command signals as desired.

Similarly, output circuitry 348 can be provided to allow the controller 322 to provide separate and independent output signals to the two valves (valve A and valve B), via the outputs 319. This circuitry 348 can include a diode device 351, as well as a transistor 350 for each valve output signal. A power signal 352 can be provided to each of these valves as well. The output 353 provides an actuation output signal to indicate to Valve A whether it should open or close, while the output 355 provides a separate and independent actuation output signal to Valve B telling it to open or close.

Likewise, interface circuitry 358 can be provided to allow the switches 320 to provide signals to the controller 322 to indicate the operating parameters and/or modes. Here, the circuit 358 comprises a shift register device which receives the parallel switch input signals and provides them as a single input to the controller 322, in serial format. Thus, the controller 322 need not have a distinct input for each switch 320.

Other circuitry can be utilized as needed, appropriate, or desired. For instance, voltage regulation circuitry 360 can be provided in association with the voltage switched by the switches 320. Likewise, circuitry 364 can be used to assist in supplying a power signal among the modules to be connected via inputs 361, 363. Furthermore, a power supply circuit 362 can be provided for supplying a voltage signal for use by the modules.

Other features can also be provided with the control modules described above and with other control modules. For example, FIG. 17a is a flow diagram showing an illustrative sleep mode of operation which can be utilized in a module controlling one or more zones, and which operates according to an aspect of the present invention. According to this example, a wakeup signal is received at block 400 from the upstream zone indicating whether that zone has a product in it (or arriving from another upstream zone). This can be received from a module or from a sensor or other circuit. This wakeup signal is then passed to another control module so that multiple control modules can be awakened when a product is incoming. At decision block 402, it is determined whether the sleep mode is active for the zone. If not, then wakeup is not applicable. At decision block 404, it is then determined whether the wakeup signal is true (indicating that a product is incoming) or false (indicating that no product is incoming). If the signal is true, then block 406 is executed causing the present zone to be powered (i.e., to wakeup to get ready for the incoming product). By allowing multiple zones to wakeup (the present zone and one or more downstream zones), the risk is lowered that the item will be slowed by entering a zone that has not been powered in time. To provide for this multiple zone wakeup, the wakeup signal can be passed to additional control circuits or modules, as discussed above. However, if a single circuit is controlling the present zone and the at least one other downstream zone, then that circuit itself can wakeup those zones.

Figure 17B:
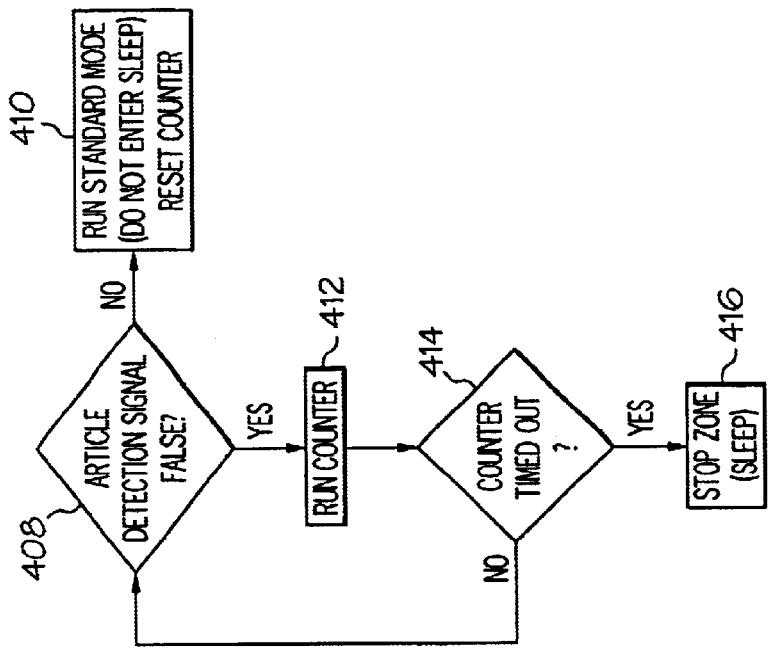
FIG. 17b is a flow diagram showing an illustrative mode of operation for entering a sleep mode, which can be utilized in a conveyor module and which operates according to particular principles of the present invention.
Figure 17A:
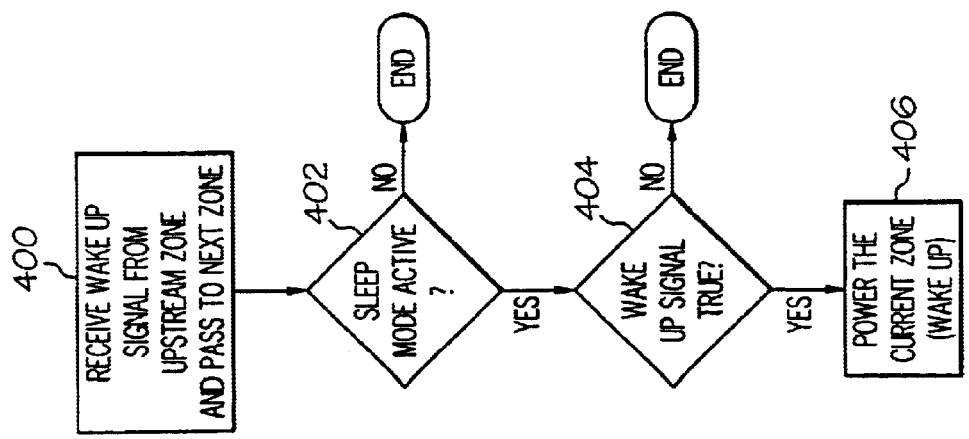
FIG. 17a is a flow diagram showing an illustrative wakeup mode of operation which can be utilized in a conveyor module and which operates according to particular principles of the present invention.

FIG. 17b is a flow diagram depicting an illustrative method for placing a zone in sleep mode. In particular, the article detection signal for the present zone is analyzed, at decision block 408. If that signal is true, indicating the presence of an item in the sensor for the present zone, then the standard mode of operation is executed for that zone, such as the applicable accumulation or release modes for instance, as shown at block 410, and the counter is reset. If that signal is false, however, indicating that no item is present in the zone, then a counter is modified by one unit as shown at block 412. It is then determined if that counter has timed out (or otherwise reached a predetermined value) as shown at decision block 414. If so, then the zone is stopped and enters a sleep mode, as shown at block 416. If not, then the process returns to block 408, where the status of the article detection signal is again checked, and the counter again changed (at block 412) if no item is present.

Other features such as jam detection can also be provided. For instance, if a downstream zone is jammed due to the presence of an item in that zone for a given period of time, then the downstream zone is continually driven to attempt to free the item, the upstream zone is stopped such that items do not collide with the jammed item, and an accumulation signal is provided to the adjacent upstream zone. (As an alternative to the jam detection feature described, if reversing capability is utilized such as by driving the conveying elements with reversible electric motors, then the zone experiencing a jam could be periodically switched from forward to reverse using forward and reverse signals from the module in an attempt to free the jammed item.)

As indicated above, many possible arrangements, configurations, components, modes of operation, and logic flows can be utilized without departing from the aspects of the invention. In particular, it should be understood that the foregoing descriptions of the illustrative embodiments have been presented for purposes of illustration and description only and should not be regarded as restrictive or limiting. They are not intended to be exhaustive or to limit the scope of the claims to the precise forms disclosed, and many modifications and variations are possible and contemplated in light of the above teachings.

Figure 18:
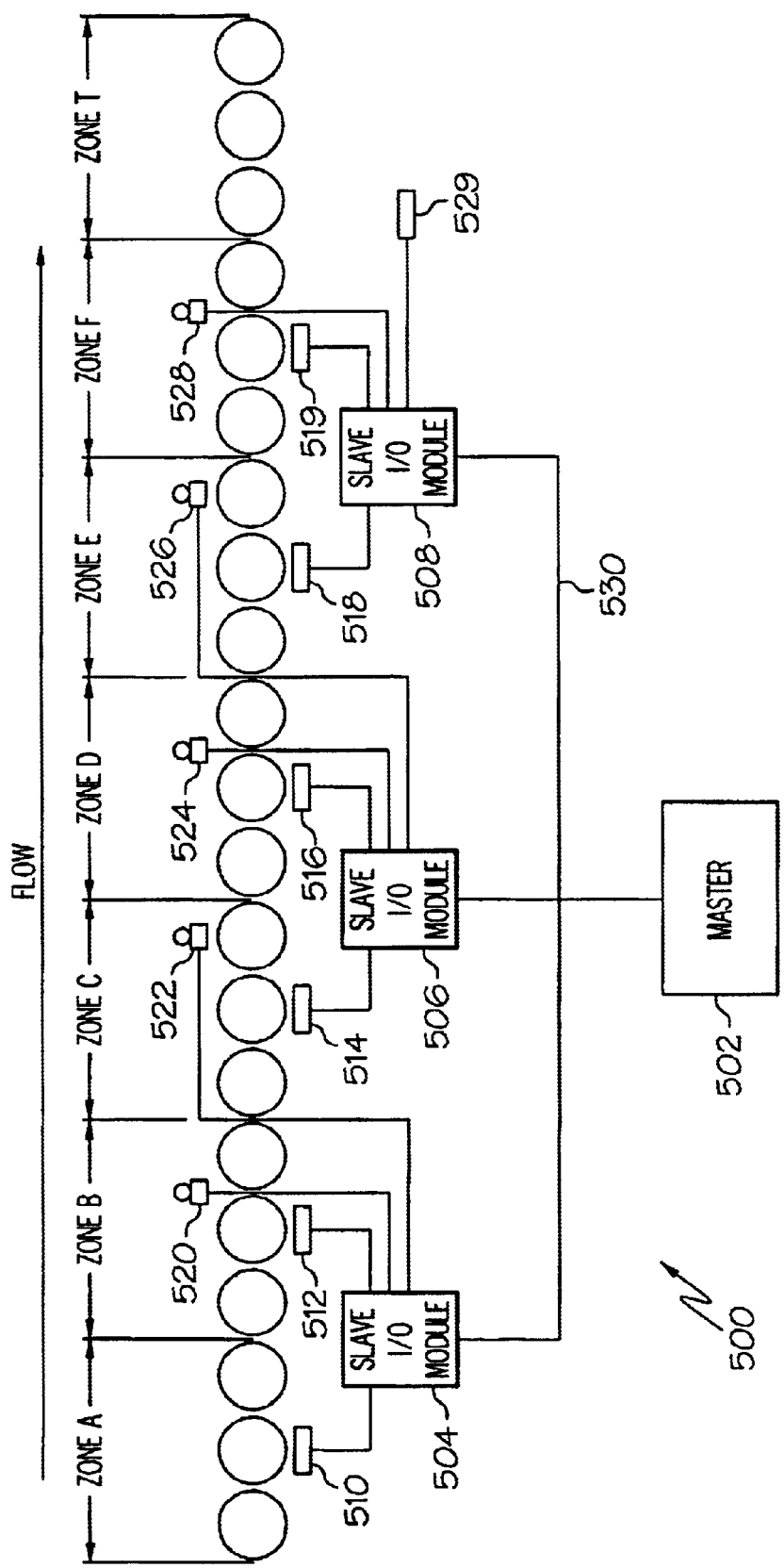
FIG. 18 is a schematic showing an illustrative embodiment of another conveyor controller system, wherein a number of slave input/output control modules, each of which controls multiple zones of the conveyor, are in communication with a master control module which coordinates the signals provided by the slave modules, in accordance with particular principles of the present invention.

For example, FIG. 18 is a schematic showing an illustrative embodiment of another conveyor controller system 500, wherein a number of slave input/output control modules, each of which controls multiple zones of the conveyor, are in communication with a master control module which coordinates the signals provided by the slave modules. In particular, slave control module 504 provides actuation signals to two zone actuators 510 and 512 which control the powering of zones A and B respectively. Likewise, slave module 506 provides actuation signals to zone actuators 514 and 516 which control zones C and D, and slave module 508 provides actuation signals to zone actuators 518 and 519 which control zones E and F. As discussed above, the actuation signals can be pneumatic signals, in which case the actuators can be pucks or clutches, or the actuation signals can be electrical signals, in which case the actuators can be valves, solenoids, switching devices, motors or other electrically driven devices. Also, if desired, each slave module 504, 506, 508 could control more than two zones of the conveyor.

In addition, in this illustrative embodiment, each module 504, 506, 508 can receive article detection signals from sensors. In particular, in this example, module 504 receives signals from sensor 520 which senses whether an item is located in zone B and from sensor 522 which senses whether an item is located in Zone C. Likewise, module 506 receives signals from sensor 524 for Zone D and from sensor 526 for Zone E. Module 508, in turn, receives a signal from sensor 528 for Zone F, and also receives a signal from the control device 529, which can comprise a relay or switch or other device for controlling whether an accumulation or release command signal is provided.

The signals are reported by these I/O modules 504, 506, and 508 to a master control module 502 via one or more communication links 530, which can comprise one or more channels, links, lines, or the like. Any of a variety of communication protocols or formats can be utilized. For example, serial communication links, bus-type links, or two-wire links, such as an AS-I communication link, could be utilized. Based upon the sensor signals received, the master module 502 then provides appropriate control signals for each of the modules 504, 506, and 508. The master module can include control signal circuitry which executes a stored program, logic, algorithm or instructions for carrying out the desired control. For instance, for each of the six controlled zones, the master module 502 could execute an accumulation mode or a release mode, depending on the status of the device 529. The release modes can be a singulation mode or multi-slug mode, such as modes which are similar or the same as those described above. The accumulation mode can also be similar or the same to those described above. Sleep, jam detect, delay timer, and other features can also be incorporated if desired. Moreover, a user input device could be provided to allow the user to determine the modes and/or parameters to be utilized by the master module 502. Following the instructions from the master module 502, each slave module 504, 506, and 508, then provides the appropriate signals to the actuators 512, 514, 516, 518, 519, causing the rollers or other conveying elements for each zone to be powered or stopped. Each slave module 504, 506, and 508 can include interface circuitry for receiving the signals from the master module 502, for delivering signals to the actuators, and for receiving signals from the sensors and transmitting them to the master module 502. The modules 504, 506, and 508 need not communicate with one another and need not include any control circuitry. Rather, they can relay signals to the master module 502 and provide actuation signals under the control of the master module.

Other features can also be provided in association with the system of FIG. 18, such as one or more displays or output devices indicating item count, conveyor status, maintenance schedule, and/or other information. Moreover, an interface can be provided if desired on the master module 502 for connection to other control, monitoring, computing, or programming devices.

In the various illustrative embodiments and alternatives described herein, the actuation signals described herein can include pneumatic signals which control pneumatic devices and/or electrical signals which control electrical devices. The actuators for controlling each zone can comprise mechanical devices which engage mechanical clutch members for a zone, electrical devices which switch a drive device, and/or motors which directly drive each zone. Furthermore, the article detection sensors can comprise mechanical, electrical and/or photo-electrical devices and can provide any of a variety of formats for the article detection signals. In addition, the number of zones controlled by a given multi-zone module can be varied, such as two, three, four, or more zones per module, for instance. Finally, the inputs and outputs can include any of a variety and number of connectors, pins, ports, interfaces, lines, and/or wires, and the control circuit can comprise any of a variety of controllers, logic devices, logic circuitry, processors and the like.

Accordingly, while a number of illustrative and alternate embodiments, methods, systems, configurations, and potential applications have been described, it should be understood that many variations and alternatives could be utilized without departing from the scope of the invention. In addition, while various aspects of the invention have been described, these aspects need not necessarily be utilized in combination. Thus, it should be understood that the embodiments and examples have been chosen and described only to best illustrate the various principals of the invention and their practical applications to thereby enable one of ordinary skill in the art to best utilize them in various embodiments and with various modifications as are suited for particular uses contemplated. Consequently, it is intended that the scope of the aspects of the invention be defined by the claims appended hereto, and that these claims are not to be limited by details of the examples described above.

What is claimed is:

1. An accumulating conveyor system, the system comprising:
   at least one drive mechanism;
   a first zone comprising a plurality of rollers selectively rotatable in unison by the at least one drive mechanism;
   a second zone comprising a plurality of rollers selectively rotatable in unison by the at least one drive mechanism;
   a single control module comprising:
      an input configured to receive a first article detection signal from a first article detection sensor for the first zone;
      an input configured to receive a second article detection signal from a second article detection sensor in the second zone;
      an input configured to receive a command signal from another control module;
      an output configured to provide a first actuation signal to cause selective rotation of the rollers of the first zone of the conveyor;
      an output configured provide a second actuation signal to cause selective rotation of the rollers of the second zone of the conveyor; and
      a single control circuit having a single microcontroller receiving signals representing the command signal and the first and second article detection signal for the first and second zones, wherein the single microcontroller includes a control program configured to independently control the first and second actuation signals for controlling the first and second zones based upon the status of the first and second article detection signals and the command signal.

2. The system as recited in claim 1, further comprising a pair of pneumatic valves configured to provide the actuation signals under control of the control circuit, wherein the actuation signals comprise pneumatic signals.

3. The system as recited in claim 1, further comprising a housing having the inputs, and the outputs, wherein the housing houses the control circuit.

4. The system as recited in claim 1, wherein the article detection sensors comprise photo-electric sensors.

5. The system as recited in claim 1, wherein the actuation signals comprise electrical signals.

6. The system as recited in claim 1, further comprising at least one input device configured to provide input signals to the control circuit for selecting the mode of operation of the control circuit.

7. The system as recited in claim 6, wherein the input device comprises switches that include one or more switches for operating the first actuation signal according to a singulation mode or a multi-slug mode and one or more switches for operating the second actuation signal according to a singulation or a multi-slug mode.

8. The system as recited in claim 6, wherein the input device is configured to indicate the speed of the conveyor with which the module will be used.

9. The system as recited in claim 1, further comprising:
   a third output configured to provide a signal to another similar module.

10. A control system for an accumulating conveyor having a plurality of independently driven zones, the system comprising:
an input/output module comprising:
an input configured to receive a first article detection signal from a first article detection sensor for a first zone in an accumulating conveyor, the first zone comprising a plurality of rollers selectively rotatable in unison by a drive mechanism;
an input configured to receive a second article detection signal from a second article detection sensor in a second zone of the accumulating conveyor, the second zone comprising a plurality of rollers rotatable in unison by a single drive mechanism;
an output configured to provide a first actuation signal to cause selective rotation of the rollers of the first zone of the conveyor; and
an output configured to provide a second actuation signal to cause selective rotation of the rollers of the second zone of the conveyor;
a control module in communication with the input/output module to receive the first and second article detection signals, wherein the control module includes a single control circuit configured to receive signals representing the status of the first and second article detection signals for the first and second zones and to control the first and second actuation signals for the first and second zones using the status of the first and second article detection signals.

11. The system as recited in claim 10, wherein the input/output module further comprises a pair of pneumatic valves configured to provide the actuation signals under control of the control module.

12. The system as recited in claim 10, further comprising a serial communication link between the control module and the input/output module.

13. The system as recited in claim 10, further comprising:
a second input/output module comprising:
an input configured to receive an article detection signal from an article detection sensor for a third zone in an accumulating conveyor, the third zone comprising a plurality of rollers selectively rotatable in unison by a drive mechanism;
an input configured to receive an article detection signal from an article detection sensor in a fourth zone of the accumulating conveyor, the fourth zone comprising a plurality of rollers rotatable in unison by a single drive mechanism;
an output configured to provide an actuation signal to cause selective rotation of the rollers of the third zone of the conveyor; and
an output configured provide an actuation signal to cause selective rotation of the rollers of the fourth zone of the conveyor;
wherein the control module is in communication with the second input/output module to receive the article detection signals from the second input/output module, and wherein the single control circuit is configured to control the actuation signals of the second input/output module using the status of the article detection signals from the second input/output module.

14. A method for controlling two or more conveyor zones using a single control module, the method comprising:
receiving in a control module at lease one signal from another control module for controlling the operation of the control module;
using a single microcontroller in the control module to control a first actuation signal for selectively powering or stopping a first conveyor zone in response to the at least one signal; and
using a single microcontroller in the control module to control a second actuation signal for selectively powering or stopping a second conveyor zone in response to the at least one signal, wherein the single control module further receives article detection signals from sensors indicating whether article are present in two zones of the conveyor and controls the first and second actuation signals for the first and second zones based upon the article detection signals.

15. The method as recited in claim 14, wherein the at least one signal comprises a command signal having one of an accumulation state and a release state.

16. The methods as recited in claim 14, wherein the actuation signals comprise electric signals for controlling at least one of a valve, a motor, and a solenoid.

17. A control module for controlling at least one zone of a conveyor;
an input configured to receive an article detection signal from a zone of a conveyor;
an output configured to provide an actuation signal for control of a zone of the conveyor;
a user input device configured to receive an input from a user representing a selected speed at which the conveyor will run; and
a programmable control circuit including a conveyor control program with selectable timing parameters, wherein the programmable control circuit is configured to select a timing parameter based upon the user input representing the conveyor speed and wherein the control circuit is configured to utilize the article detection signal, the program, and timing parameter to control the timing of the activation of the actuation signal, such that the timing is based upon the user selected conveyor speed.

18. The module as recited in claim 17, wherein the output comprises a pneumatic connector.

19. The module as recited in claim 17, wherein the user input device comprises at least one switch.

* * * * *

UNITED STATES PATENT AND TRADEMARK OFFICE
CERTIFICATE OF CORRECTION

PATENT NO. : 6,827,202 B2
DATED : December 7, 2004
INVENTOR(S) : David A. Topmiller et al.

It is certified that error appears in the above-identified patent and that said Letters Patent is hereby corrected as shown below:

Column 24,
Line 33, change "conveyor;" to -- conveyor, comprising: --
Line 21, change "article" to -- articles --

Signed and Sealed this

Seventeenth Day of May, 2005

JON W. DUDAS
*Director of the United States Patent and Trademark Office*